US011316694B2

(12) United States Patent
Thom et al.

(10) Patent No.: US 11,316,694 B2
(45) Date of Patent: Apr. 26, 2022

(54) CRYPTOGRAPHIC HARDWARE WATCHDOG

(71) Applicant: Microsoft Technology Licensing, LLC, Redmond, WA (US)

(72) Inventors: Stefan Thom, Snohomish, WA (US); Brian Clifford Telfer, Seattle, WA (US); Paul England, Bellevue, WA (US); Dennis James Mattoon, Kirkland, WA (US); Marcus Peinado, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 438 days.

(21) Appl. No.: 16/366,461

(22) Filed: Mar. 27, 2019

(65) Prior Publication Data

US 2020/0313893 A1 Oct. 1, 2020

(51) Int. Cl.
*H04L 9/32* (2006.01)
*G06F 8/65* (2018.01)
(Continued)

(52) U.S. Cl.
CPC .............. *H04L 9/3234* (2013.01); *G06F 8/65* (2013.01); *G06F 9/4401* (2013.01); *G06F 21/567* (2013.01); *H04L 9/3271* (2013.01)

(58) Field of Classification Search
CPC ... H04L 9/3234; H04L 9/3271; H04L 9/0897; H04L 63/14; H04L 63/0209; G06F 8/65;
(Continued)

(56) References Cited

U.S. PATENT DOCUMENTS 9,507,579 B2 11/2016 Gambardella et al.
9,529,602 B1 12/2016 Swierk et al.
(Continued)

FOREIGN PATENT DOCUMENTS

WO 2016020640 A1 2/2016

OTHER PUBLICATIONS

"Notice of Allowance Issued in U.S. Appl. No. 15/888,899", dated Jun. 12, 2019, 11 Pages.
(Continued)

*Primary Examiner* — Robert B Leung
*Assistant Examiner* — Bruce S Ashley
(74) *Attorney, Agent, or Firm* — Mark K. Young; Mayer & Williams, PC

(57) ABSTRACT

A computing device's trusted platform module (TPM) is configured with a cryptographic watchdog timer which forces a device reset if the TPM fails to solve a cryptographic challenge before the expiration of the timer. The computing device's TPM is configured to generate the cryptographic challenge, to which the computing device does not possess the cryptographic token for resolution. While the watchdog timer counts down, the computing device requests a cryptographic token from a remote service to solve the challenge. The remote service transmits the cryptographic token to the computing device so long as the remote service identifies no reason to withhold the token, such as the computing device being infected with malware. The interoperability of the computing device and remote service enables the remote service to exercise control and reset capabilities over the computing device.

20 Claims, 18 Drawing Sheets

Token or Update command
130
110
105
Network
115
TPM
120
Remote service
Token request
125

(51) Int. Cl.
*G06F 9/4401* (2018.01)
*G06F 21/56* (2013.01)

(58) Field of Classification Search
CPC ................. G06F 9/4401; G06F 21/567; G06F 2221/2103; G06F 9/4416; G06F 21/575; H04W 12/12
See application file for complete search history.

(56) References Cited

U.S. PATENT DOCUMENTS

| | | | |
|---|---|---|---|
| 9,645,811 B2 | 5/2017 | Carlen et al. | |
| 9,804,901 B2 | 10/2017 | Gambardella et al. | |
| 9,992,018 B1 * | 6/2018 | Tjew | H04L 9/0861 |
| 10,185,730 B2 | 1/2019 | Bestler et al. | |
| 2006/0143446 A1 | 6/2006 | Frank et al. | |
| 2006/0294312 A1 * | 12/2006 | Walmsley | H04L 9/0662 711/122 |
| 2012/0278878 A1 | 11/2012 | Barkie et al. | |
| 2014/0082434 A1 | 3/2014 | Knight et al. | |
| 2015/0058640 A1 | 2/2015 | Balakrishnan et al. | |
| 2017/0222815 A1 * | 8/2017 | Meriac | G06F 21/554 |
| 2018/0341584 A1 | 11/2018 | Letey et al. | |
| 2019/0081873 A1 | 3/2019 | Kraft | |
| 2019/0081983 A1 | 3/2019 | Teal | |
| 2019/0243630 A1 | 8/2019 | England | |

OTHER PUBLICATIONS

Moharreri, et al., "Recommendations for Achieving Service Levels within Large-scale Resolution Service Networks", In Proceedings of the 8th Annual ACM India Conference, Oct. 29-31, 2015, 10 Pages.

"Trusted Platform Architecture—Hardware Requirements for a Device Identifier Composition Engine", Retrieved From: https://www.trustedcomputinggroup.org/wp-content/uploads/Device-Identifier-Composition-Engine-Rev69_Public-Review.pdf, Dec. 16, 2016, 11 Pages.

"Non Final Office Action Issued in U.S. Appl. No. 15/888,899", dated Feb. 28, 2019, 09 Pages.

England, et al., "Cyber-Resilient Platform Requirements", Retrieved from: https://www.microsoft.com/en-us/research/publication/cyber-resilient-platform-requirements/, Aug. 28, 2017, pp. 1-17.

England, et al., "Device Identity with DICE and RIoT: Keys and Certificates", In Technical Report of MSR-TR-2017-41, Sep. 21, 2017, pp. 1-15.

England, et al., "RIoT—A Foundation for Trust in the Internet of Things", In Technical Report of MSR-TR-2016-18, Apr. 21, 2016, pp. 1-17.

George, Sam, "Microsoft simplifies IoT further", Retrieved from: https://blogs.microsoft.com/iot/2017/04/20/microsoft-simplifies-iot-further/, Apr. 20, 2017, 6 Pages.

Qiu, et al., "Trusted Computer System Evaluation Criteria", In National Computer Security Center, Dec. 26, 1985, pp. 1-116.

Regenscheid, Andrew, "Platform Firmware Resiliency Guidelines", Retrieved from: https://csrc.nist.gov/CSRC/media/Publications/sp/800-193/draft/documents/sp800-193-draft.pdf, May 2017, 46 Pages.

Samuel, Arjmand, "Azure IoT supports new security hardware to strengthen IoT security", Retrieved from: https://azure.microsoft.com/en-us/blog/azure-iot-supports-new-security-hardware-to-strengthen-iot-security/, Apr. 20, 2017, 4 Pages.

"International Search Report and Written Opinion Issued in PCT Application No. PCT/US20/022872", dated Jun. 8, 2020, 10 Pages.

* cited by examiner

110
Remote service
130
Token or Update command
115
Network
125
Token request
TPM
105
120

200
Application layer 205
250
Applications
250
Applications
Operating System (OS) layer 210
260
Manage system
265
Operate applications
Hardware layer 215
Processor(s)
220
Memory
225
Sensors
235
TPM
120
NIC
230
Computing devices
$105_n$
$105_2$
$105_1$ 105
TPM
120
Cryptographic watchdog timer (305)
1:00:00
0:59:59
0:59:58
0:00:05
0:00:04
0:00:03
0:00:02
0:00:01
RESET from ROM
310
During countdown
Repeat (335)
315
Generate cryptographic challenge
320
Request cryptographic token from remote service
325
Receive token and solve challenge
330
Reset timer 105
120
TPM
Cryptographic challenge
(405)
Periodically
generated
410
305
20 seconds
One minute
One hour
24 hours
One month Cryptographic challenge
(405)
DB8AC1C259EB8...
HelloWorld
Cryptographic token
(510)
Solved Hardware cryptographic watchdog timer
110
Remote service
510
Cryptographic token
105
120
TPM
605
Solve challenge and reset cryptographic watchdog timer
Discrete TPM (610)
Integrated TPM (615)

Firmware with secure watchdog timer
110
Remote service
710
Cryptographic token
105
120
TPM
Solve challenge in firmware
705
Trigger reset of watchdog timer
715

FIG 8
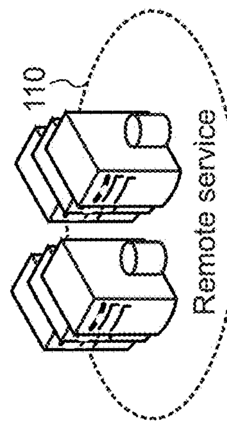
Are there any reasons to withhold the cryptographic token?
805
Yes
No
Withhold cryptographic token from transmission to the computing device
815
Prepare and transmit cryptographic token to the computing device
810
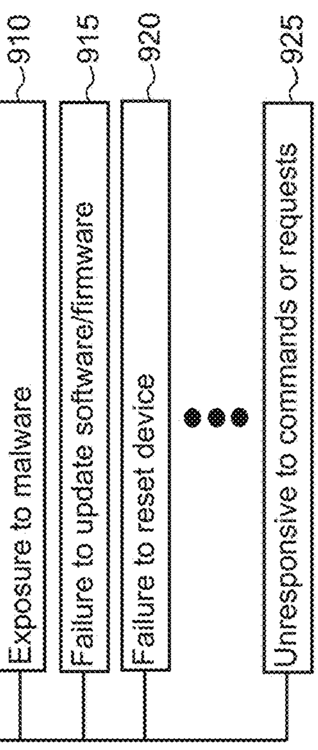
FIG 9

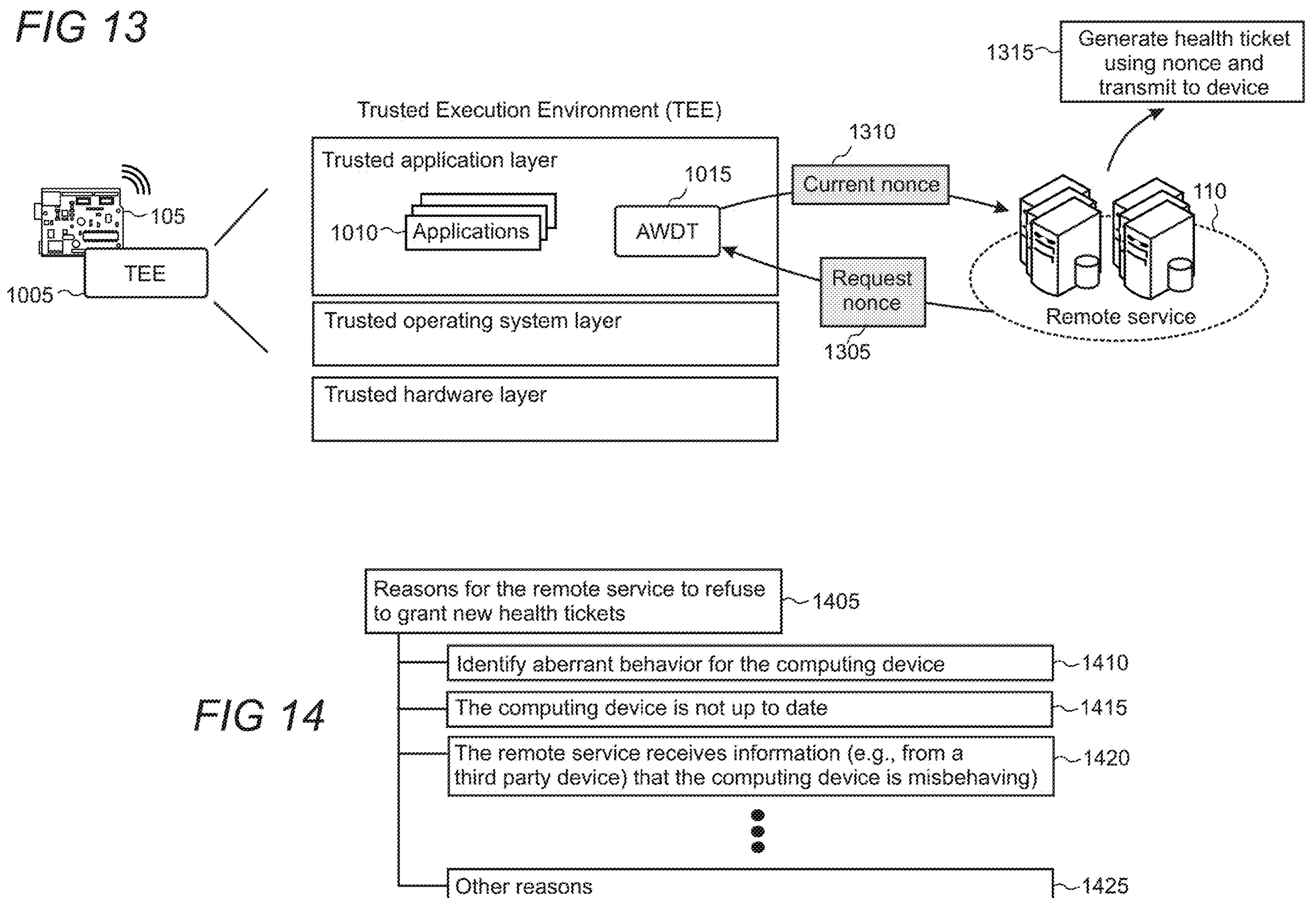
FIG 13
105
1005
TEE
Trusted Execution Environment (TEE)
Trusted application layer
1010
Applications
1015
AWDT
Trusted operating system layer
Trusted hardware layer
1310
Current nonce
Request nonce
1305
110
Remote service
1315
Generate health ticket using nonce and transmit to device
FIG 14
1405
Reasons for the remote service to refuse to grant new health tickets
1410
Identify aberrant behavior for the computing device
1415
The computing device is not up to date
1420
The remote service receives information (e.g., from a third party device) that the computing device is misbehaving)
1425
Other reasons -Application data
-Application code
-Operating system
Process (1505)
Unsecure (1510)
Enclave (1515)
Unsecure
Unsecure
Protected area of execution for TEE
Trusted Execution Environment (1005)
Trusted operating system layer
Trusted operating system layer
Trusted hardware layer
105

1515
1 - n
Enclaves
AWDT
1015
Continue operations or reset device?

1800

1900

2000

2100

2200

2300
Sensor(s)
2314
Processors
2302
Network I/F
2316
I/O controller
2318
2310
Battery/ power supply
2320
Memory
2304
RAM
ROM
2306
2308
Mass storage device
2312

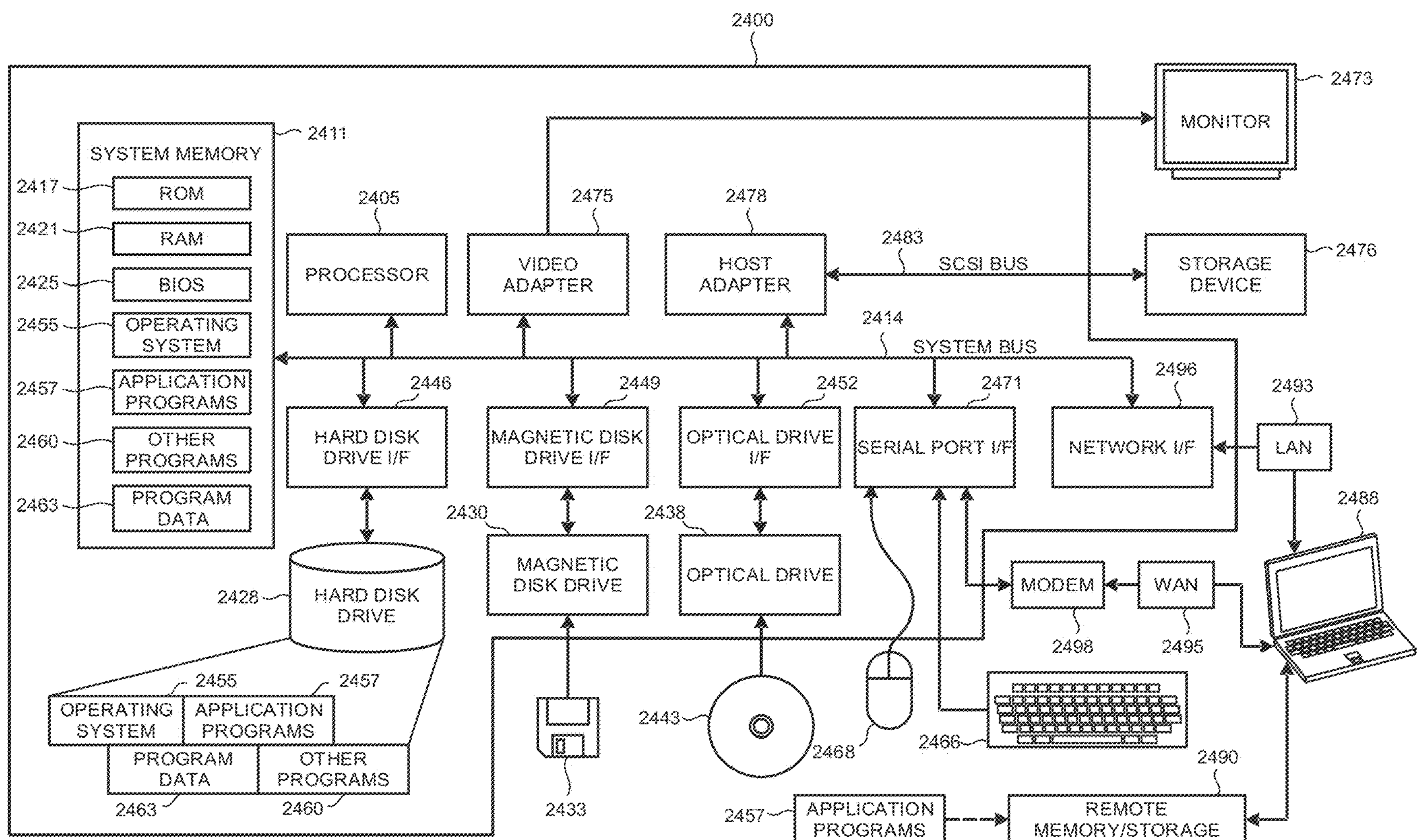
FIG 24
2400
SYSTEM MEMORY
2411
2417
ROM
2421
RAM
2425
BIOS
2455
OPERATING SYSTEM
2457
APPLICATION PROGRAMS
2460
OTHER PROGRAMS
2463
PROGRAM DATA
2405
PROCESSOR
2475
VIDEO ADAPTER
2478
HOST ADAPTER
2483
SCSI BUS
MONITOR
2473
STORAGE DEVICE
2476
2414
SYSTEM BUS
2446
HARD DISK DRIVE I/F
2449
MAGNETIC DISK DRIVE I/F
2452
OPTICAL DRIVE I/F
2471
SERIAL PORT I/F
2496
NETWORK I/F
2493
LAN
2486
2430
MAGNETIC DISK DRIVE
2438
OPTICAL DRIVE
2428
HARD DISK DRIVE
MODEM
2498
WAN
2495
2455
2457
OPERATING SYSTEM
APPLICATION PROGRAMS
PROGRAM DATA
OTHER PROGRAMS
2463
2460
2433
2443
2468
2466
2490
2457
APPLICATION PROGRAMS
REMOTE MEMORY/STORAGE

CRYPTOGRAPHIC HARDWARE WATCHDOG

BACKGROUND

A trusted platform module (TPM) can be exposed to malware which operates in ways harmful to the computing device on which it operates. A computing device having network connectivity and configured to perform a discrete function (e.g., collect and transmit data) could operate unconventionally as a result of malware. For example, an electricity meter may erratically accrue electricity usage, thereby wasting the owner's resources.

SUMMARY

A computing device's trusted platform module (TPM) is configured with a cryptographic watchdog timer which forces a device reset if the TPM fails to solve a cryptographic challenge before the expiration of the timer. The computing device's TPM is configured to generate the cryptographic challenges, to which the computing device does not possess the cryptographic token for resolution. While the watchdog timer counts down, the computing device requests a cryptographic token from a remote service to solve the challenge. The remote service transmits the cryptographic token to the computing device so long as the remote service identifies no reason to withhold the token, such as the computing device being infected with malware. The interoperability of the computing device and remote service enables the remote service to exercise control and reset capabilities over the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 8 shows an illustrative flowchart in which the remote service determines whether to withhold the cryptographic token from transmission to the computing device;

FIG. 9 shows an illustrative taxonomy of reasons for which the remote service determines to withhold the cryptographic token from transmission;

FIG. 13 shows the computing device transmitting a current nonce to the remote service responsive to a request;

FIG. 14 shows a taxonomy of reasons for which the remote service refuses to grant new health tickets to the computing device;

FIG. 24 is a simplified block diagram of an illustrative remote server or computer system that may be used in part to implement the present cryptographic hardware watchdog.

Like reference numerals indicate like elements in the drawings. Elements are not drawn to scale unless otherwise indicated.

DETAILED DESCRIPTION

Figure 1:
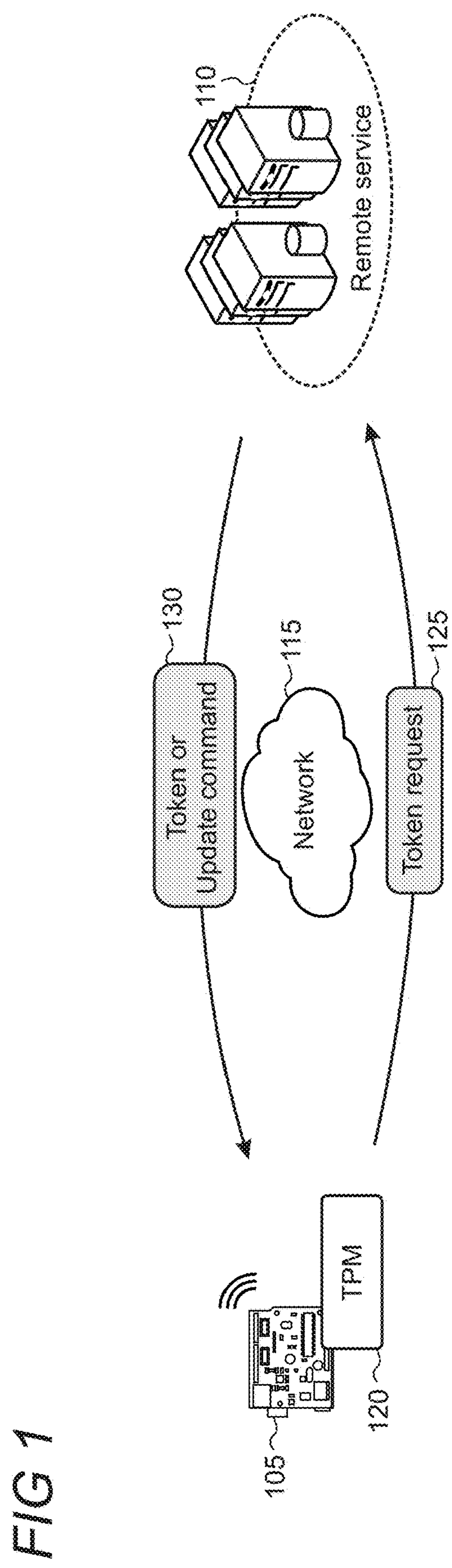
FIG. 1 shows an illustrative environment in which a computing device and remote service exchange communications over a network.

The computing device's TPM is configured to use a cryptographic token provided to it by a remote service to solve a cryptographic challenge that is periodically generated by the computing device's TPM. Resolution of the cryptographic challenge enables the computing device to continue operating. Failure to solve the cryptographic challenge by the expiration of a watchdog timer forces a device restart (restart and reset of the computing device are used synonymously herein). The time period for generation and resolution of the cryptographic challenge may vary for the given scenario, such as every ten minutes, two hours, one day, one week, etc. The challenge generated by the TPM's processor can be solved with the cryptographic token issued by the remote service which may, for example, be operated by a cloud service provider.

Utilization of the cryptographic challenge and cryptographic token enables the remote service to maintain and assert control over the computing device, such as reset capabilities. The computing device does not possess the cryptographic token to the cryptographic challenge. Therefore, the remote service can withhold the cryptographic token when it is aware or suspicious that the computing device has become compromised with malware. Withholding the cryptographic token stops the processor from being able to solve the periodically issued cryptographic challenge, which forces the computing device to reset from read-only memory (ROM).

The implementation of the cryptographic watchdog timer can be configured within the physical construction of the TPM's processor (e.g., a discrete TPM or integrated TPM) or in combination with software and hardware. When physically constructed, gates within the silicon of the processor are configured with cryptographic functions to enable resolution of cryptographic challenges using the cryptographic token provided by the remote service. A crypto processor may, for example, be configured with crypto blocks dedicated for challenge resolution.

Software implementations may leverage a non-cryptographic watchdog timer employed within the TPM processor's physical construction. The software implementation may operate at the TPM's firmware level, where resolution of the challenge using the cryptographic token is performed. The firmware triggers a reset of the watchdog timer on the processor (e.g., push a button, write to a register) upon resolution of the pending cryptographic challenge. The TPM's configuration can be issued from the remote service in a firmware update for pre-existing devices that have a secure watchdog timer operating within the TPM's processor but not configured with cryptography at the silicon level. The computing device's ROM is configured to initiate the cryptographic watchdog operations at the firmware level.

The implementation of a cryptographic hardware watchdog enhances a remote service's control over a computing device. The remote service can cheaply and effectively mitigate erratic behaviors by computing devices as a result of, for example, malware by having control over reset capabilities. The hardware implementation enables new computing devices to come preconfigured with such functionality and the firmware implementation enables existing devices to leverage a similar system. Using the technical implementation of the cryptographic hardware watchdog avoids deployment of a user, for example, to reset an electricity meter or other computing device that has been compromised with malware.

Turning now to the drawings, FIG. 1 shows an illustrative environment in which a computing device 105 and a remote service 110 communicate over a network 115. The computing device 105 depicted in FIG. 1 is a System on a Chip (SoC) device which may be utilized in Internet of Things (IoT)-enabled devices or may transition items into IoT-enabled devices, as discussed in greater detail below. The network may be a collection of network devices used for forwarding communications among devices and is comprised of local area networks, wide area networks, and the internet.

Responsive to generating a cryptographic challenge (not shown), the computing device's trusted platform module (TPM) 120 transmits a token request 125 to the remote service which the computing device uses to solve a generated cryptographic challenge. The computing device is not in possession of the cryptographic token (e.g., a key) to the cryptographic challenge and is configured to request the cryptographic token from the remote service.

The remote service can responsively transmit the cryptographic token to the computing device for utilization or, in other scenarios, can transmit an update command, as illustratively shown by numeral 130. The update can be an update to the TPM's firmware or other software update. In other scenarios, the remote service can refuse to issue the cryptographic token or the update to the computing device. As discussed in further detail below, by failing to update its system or solve the cryptographic challenge, the computing device's TPM issues an interrupt to reset the computing device from read-only memory (ROM).

Figure 2:
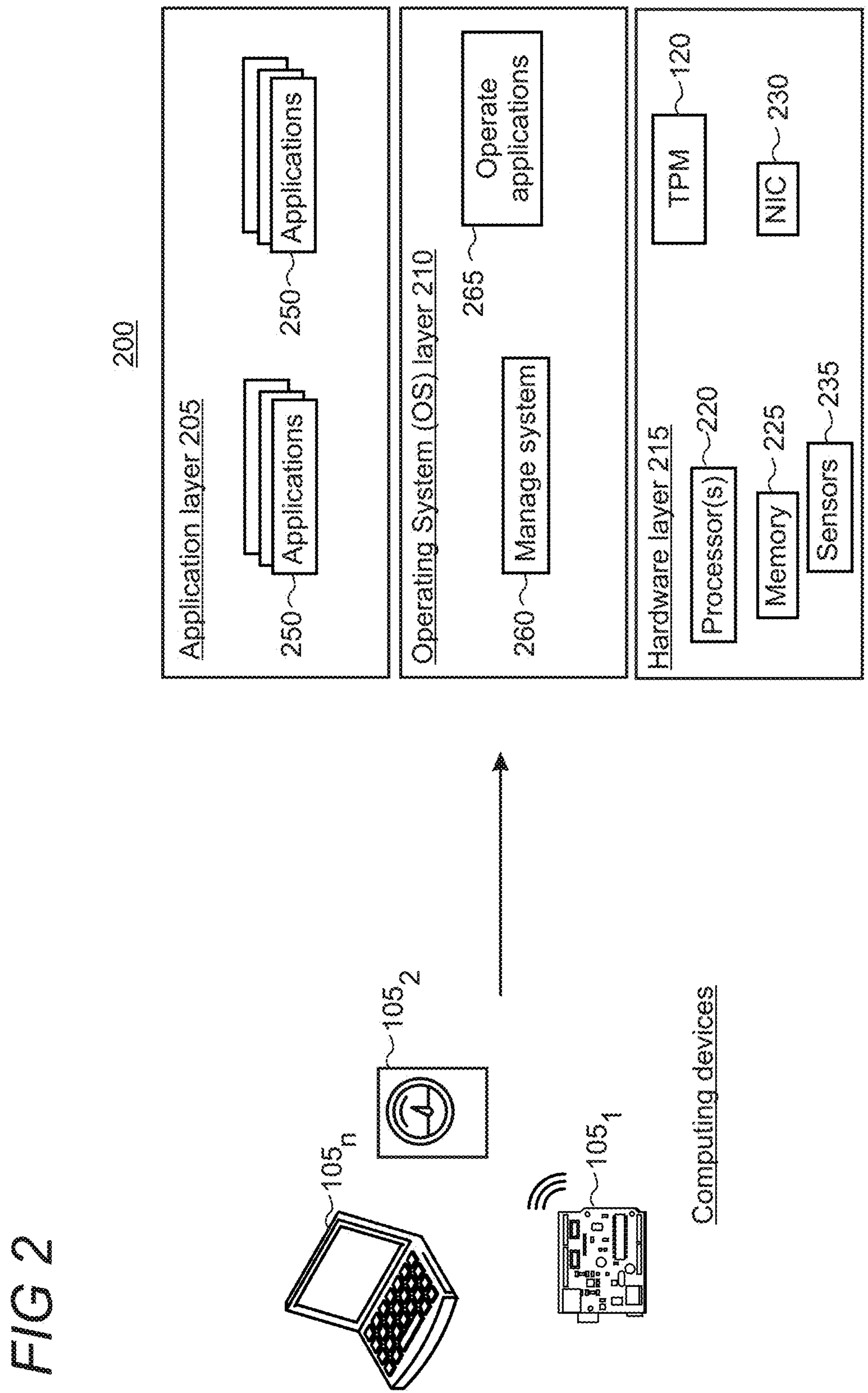
FIG. 2 shows an illustrative architecture of the computing device.

FIG. 2 shows an illustrative architecture 200 of the computing device 105 that may interconnect and/or communicate over various networks. Other user devices in addition to IoT devices can also be implemented, such as laptop computers, personal computers, smartphones, etc. The depiction of the SoC device herein is used to show the diversity of computing devices which can be utilized.

FIG. 2 shows an illustrative electricity meter which may have network connectivity to report electricity usage in a home, and the SoC which can be used to transition items into IoT devices, such as commercial machinery like a crane, or household items such as a light bulb, thermostat, and the like. The computing devices may communicate with a cloud service provider that supports various IoT solutions to, for example, facilitate and establish comprehensive knowledge, understanding, or insight into a component or its environment. The devices depicted are illustrative, as the number, variety, and/or type of objects or components which can be configured as an IoT device are not limited and can vary to meet the needs of a particular implementation.

The architecture is arranged in layers and includes a hardware layer 215, an operating system (OS) layer 210, and an application layer 205. The hardware layer 215 provides an abstraction of the various hardware used by the computing device 105 to the layers above it. In this illustrative example, the hardware layer supports one or more processors 220, memory 225, various sensors 235 (e.g., temperature sensor, barometers, proximity sensors, electricity meter) for gathering data, a NIC (network interface controller) 230 including an interface for wireless or wired connections, and a trusted platform module (TPM) 120.

The TPM 120 may be implemented using a specialized hardware chip that is configured to support hardware-based authentication for the computing device 105. The TPM is utilized to increase device integrity and security by enabling verification that the computing device performs as intended. The TPM utilizes public keys and private keys that are unique to the TPM and computing device and are kept private and secure in the TPM. A remote service can utilize the public and private keys for device recognition during an attestation process. In other embodiments, the TPM may be implemented using firmware or a combination of hardware and firmware to provide the authentication functionalities for the computing device. The computing device attestation process is performed using the unique public and private keys that are stored in the TPM. As discussed in greater detail below, the processor (in discrete TPM implementations) or a dedicated portion of the processor (in integrated TPM implementations) can be re-configured at the silicon level to solve cryptographic challenges, such as with a corresponding cryptographic token.

The application layer 205, in this illustrative example, supports various applications 250. Any number of applications can be utilized by the computing device 105, whether proprietary or third-party applications. The applications can be implemented using locally executing code. However, in some cases, applications can rely on services and/or remote code execution provided by remote servers or other computing platforms. The OS layer 210 supports, among other operations, managing the operating system 260 and applications 265. The OS layer may interoperate with the application and hardware layers to facilitate execution of programs and perform various functions and features.

Figure 3:
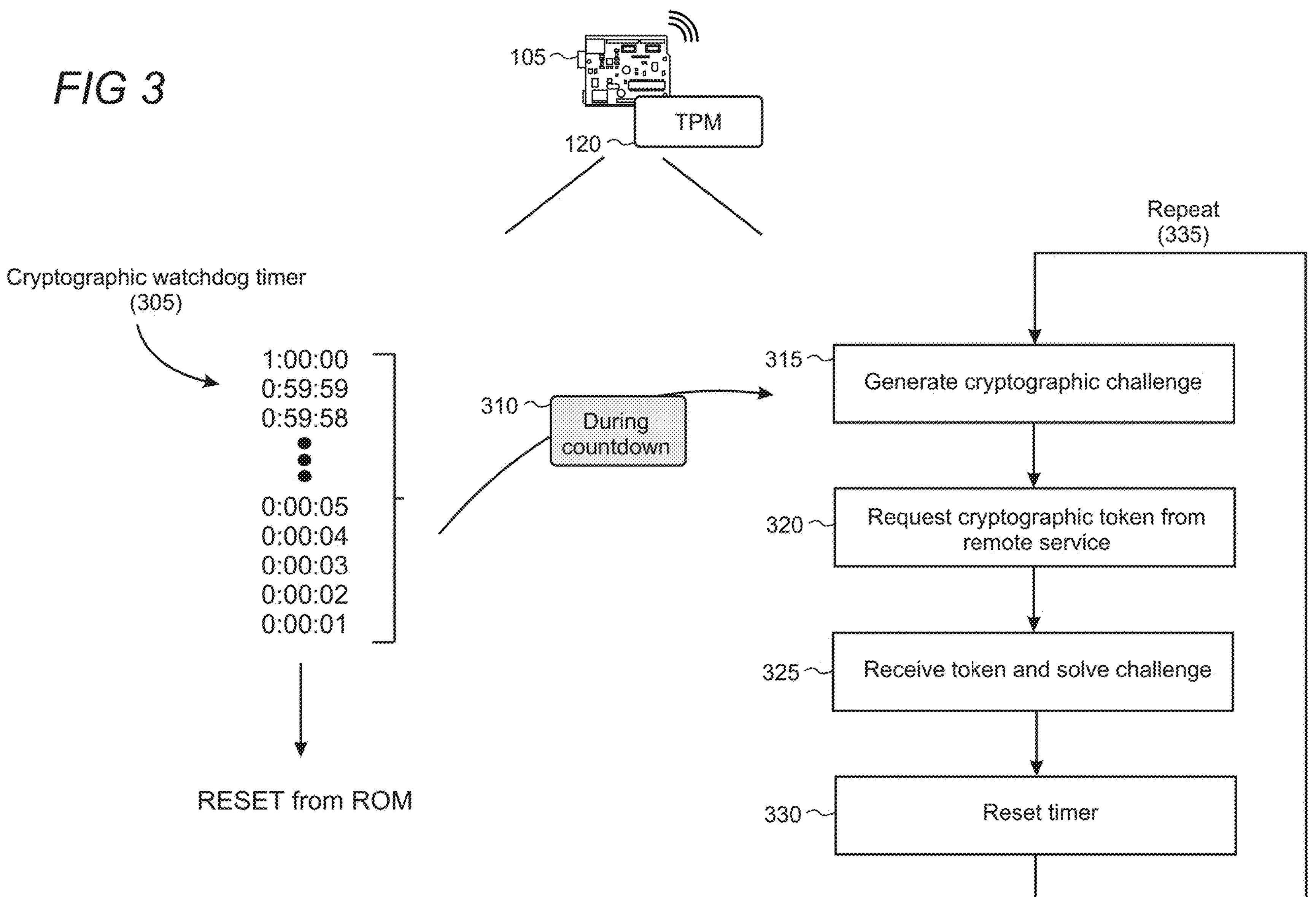
FIG. 3 shows an illustrative diagram of the operation of a cryptographic watchdog timer.

FIG. 3 shows an illustrative diagram in which a cryptographic watchdog timer 305 counts down and during the countdown a series of steps is performed by the TPM 120 of the computing device 105, as illustratively shown by numeral 310. While one hour is illustratively shown as the timer, other denominations are also possible. When the timer is initiated, the computing device's TPM generates a cryptographic challenge in step 315. The computing device does not possess the key, or cryptographic token, to solve the cryptographic challenge and is not configured to determine the corresponding cryptographic token. In step 320, the computing device's TPM requests a cryptographic token from the remote service that solves the pending cryptographic challenge. In step 325, the computing device receives the cryptographic token from the remote service and accordingly solves the cryptographic challenge. Upon resolution, the TPM resets the timer in step 330 and the process repeats itself, as illustratively shown by numeral 335.

If the TPM does not receive the cryptographic token and solve the cryptographic challenge (step 330) by the time the cryptographic watchdog timer expires, then an interrupt configured into the TPM's processor forces a reset of the computing device which causes a refresh from ROM. The cryptographic watchdog timer enables the remote service, which supplies the cryptographic token, to exercise control over the computing device. If the computing device acts erratically or otherwise indicates that it has been compromised by malware, the remote service can elect to withhold the cryptographic token from the computing device and thereby force a device reset from ROM which can effectively remove any malware infection.

Figure 4:
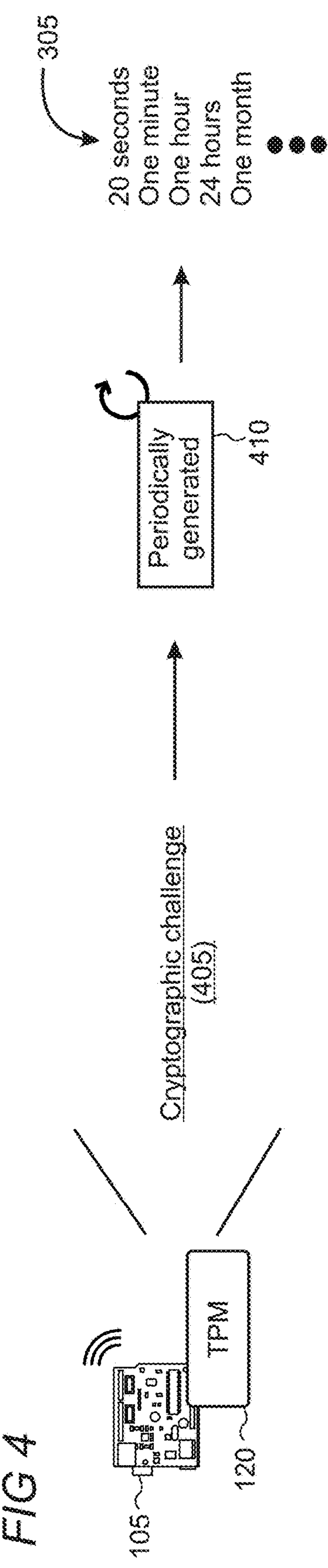
FIG. 4 shows an illustrative diagram in which the computing device periodically generates a cryptographic challenge.

FIG. 4 shows an illustrative diagram in which the TPM 120 generates the cryptographic challenge 405. The cryptographic challenge is periodically generated 410 either after resolution of a preceding cryptographic challenge or upon the firmware reset of the device if the pending cryptographic challenge is never solved (FIG. 3). The cryptographic watchdog timer varies based on the given implementation as illustratively shown in FIG. 4.

Figure 5:
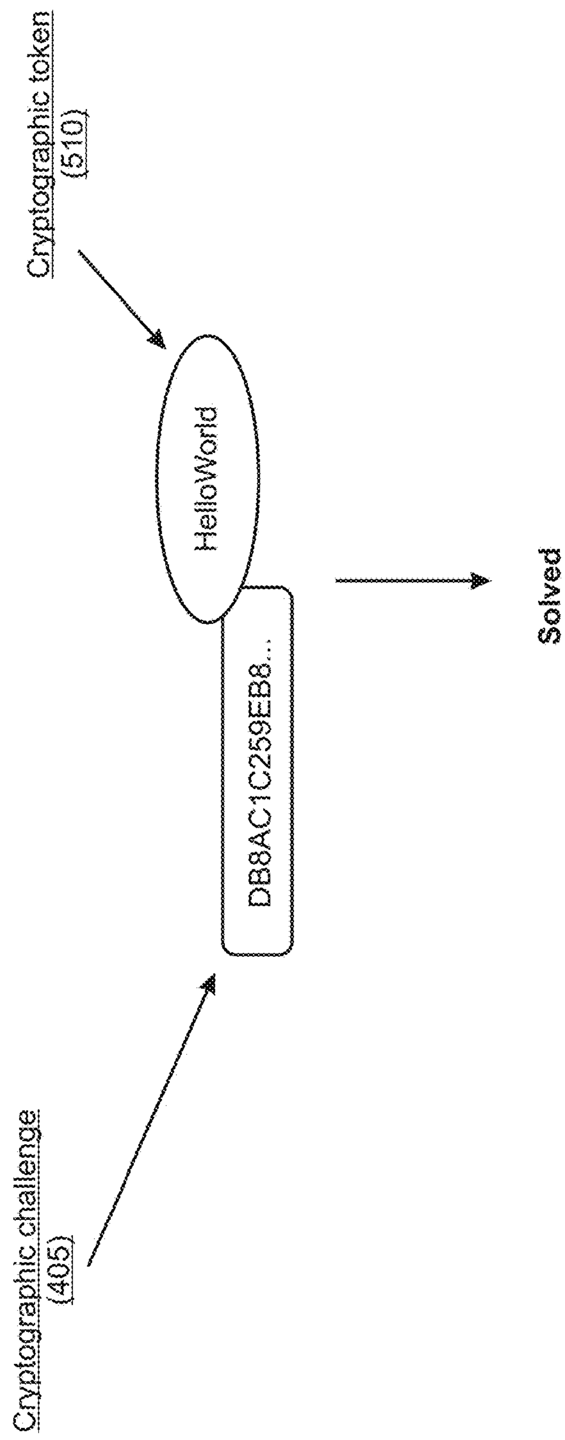
FIG. 5 shows an illustrative environment in which a cryptographic token is utilized to solve a cryptographic challenge.

FIG. 5 shows an illustrative environment in which the cryptographic challenge 405 can be, for example, a cryptographic hash function using SHA-256, SHA-1, or the like, in which a string for a target hash is either calculated or already known by the remote service. In an exemplary embodiment, the cryptographic hash function may be configured such that it is solved upon the computing device receiving a cryptographic token 510 that corresponds to the target hash or is determined to be within an acceptable range of values. The cryptographic challenge may be configured such that the processing capabilities of a remote service can easily solve the cryptographic challenge or store the answer to each generated cryptographic challenge. FIG. 5 shows an illustrative hash function in which the cryptographic token corresponds to the hash function and thereby solves the TPM's cryptographic challenge.

Figure 6:
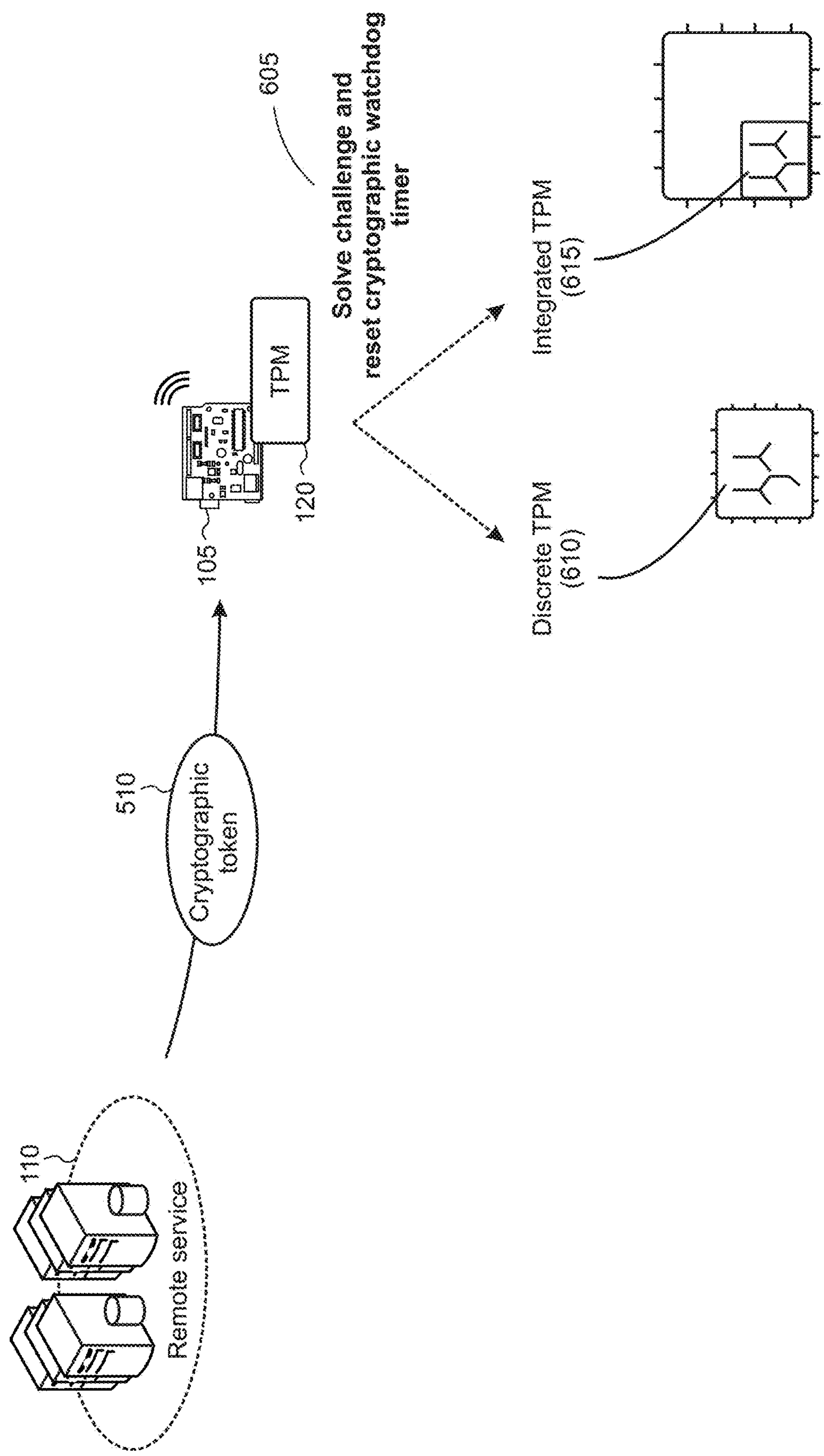
FIG. 6 shows an illustrative environment in which the computing device's trusted platform module (TPM) processor is configured to solve the cryptographic challenge and reset the watchdog timer.

FIG. 6 shows an illustrative environment in which the silicon of the TPM's processor is configured to solve cryptographic challenges at the hardware level. The processor's gates are configured to input the cryptographic token and determine whether or not the generated cryptographic challenge is solved. The TPM's processor (e.g., crypto processor) may, for example, utilize dedicated crypto blocks configured to solve the cryptographic challenges. Upon resolution of the cryptographic challenge, the TPM's processor is configured to reset the watchdog timer (FIG. 3) which prevents the watchdog timer from forcing a device reset from ROM, as illustratively represented by numeral 605. The configuration of the processor can be for a discrete TPM 610 in which the TPM has its own dedicated processor, or an integrated TPM 615 in which the TPM's processor is integrated with, but still isolated from, the processor operating within the computing device's rich execution environment.

Figure 7:
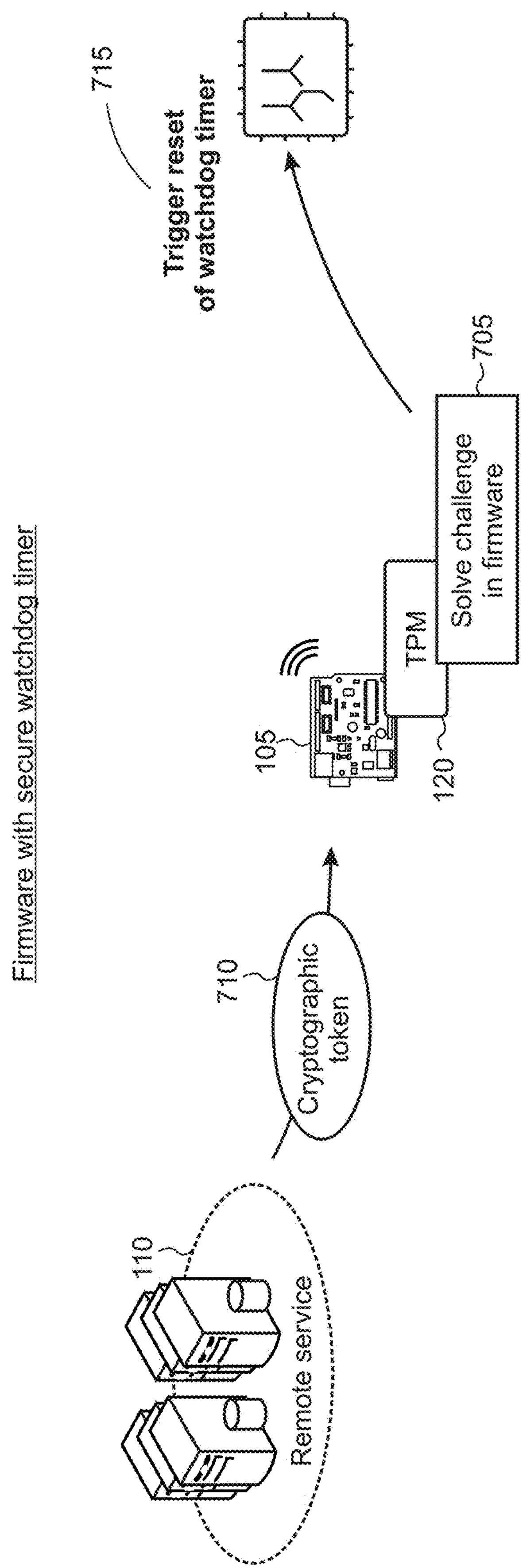
FIG. 7 shows an illustrative environment in which the computing device's firmware is configured to solve the cryptographic challenge and trigger reset of the watchdog timer in the TPM's processor.

FIG. 7 shows an illustrative environment in which the firmware of the TPM 120 is configured to generate and solve the cryptographic challenge 705. The TPM may be configured with a secure watchdog timer in its silicon, where the secure watchdog timer is distinct from a watchdog timer utilized by an operating system (e.g., Windows®) to resolve system crashes in a rich execution environment.

The computing device's TPM may receive a system or firmware update from the remote service which configures the TPM to generate cryptographic challenges and use cryptographic tokens 710 to solve respective cryptographic challenges. In this embodiment, existing TPMs that are already in use can be updated to leverage the functionality discussed herein. The TPM's firmware solves the cryptographic challenge responsive to receiving the cryptographic token from the remote service. After resolving the cryptographic challenge in firmware, the TPM notifies the TPM's secure watchdog timer to trigger a reset of the timer (e.g., push a button or write to a registry) 715. Thus, while the processor in FIG. 7 is not configured with cryptographic circuitry, the utilization of firmware enables existing TPMs to implement a cryptographic watchdog timer similar to the embodiment shown in FIG. 6.

FIG. 8 shows an illustrative environment in which the remote service 110 determines whether or not to transmit the cryptographic token to the computing device 105. In decision block 805, the remote service determines whether or not there are any reasons to withhold the cryptographic token from the computing device. FIG. 9 shows an illustrative taxonomy of reasons for which the remote service may withhold the cryptographic token from transmission to the computing device, as illustratively shown by numeral 905. Reasons include indications that the computing device has been exposed to malware 910, failure to update software/firmware 915, failure to reset device 920, or unresponsiveness to commands and or requests (e.g., status or data requests) 925. Failure to update or reset or lack of responsiveness may be indications that the computing device has been exposed to malware. By gauging the computing device's performance according to the criteria listed in FIG. 9, the remote service can utilize criteria in exercising control over the computing device (e.g., by electing to withhold the cryptographic token and thereby forcing a device reset).

Referring back to FIG. 8, in block 810, the remote service prepares and transmits the cryptographic token to the computing device when the remote service determines that there are no present reasons to withhold the cryptographic token and force a device reset. In block 815, the remote service withholds the cryptographic token from transmission to the computing device responsive to determining that at least one reason exists for doing so. In some scenarios, the remote service may continue issuing the cryptographic token despite learning that a reason may exist to withhold the token. The remote service can, for example, give the computing device a determinate number of opportunities to reset itself or install an update before forcing the computing device to reset itself by effectuating the cryptographic watchdog timer to expire.

Figure 10:
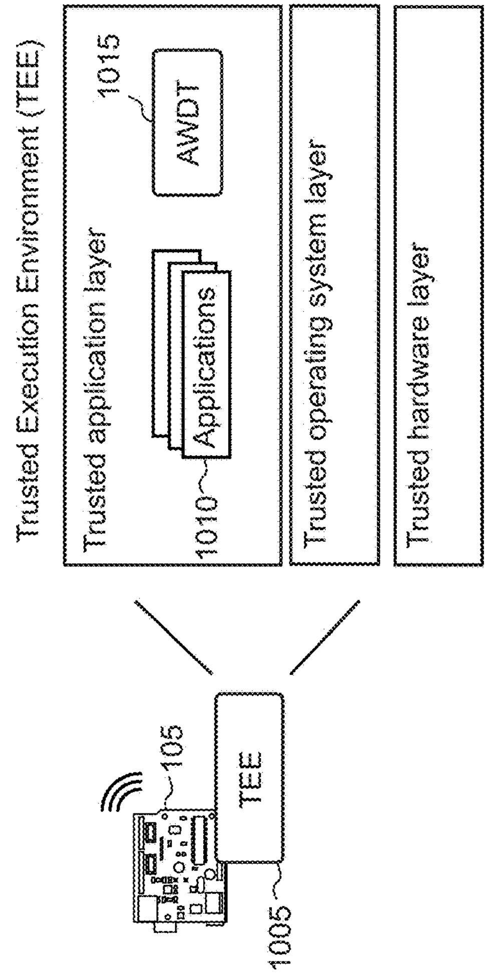
FIG. 10 shows an illustrative trusted execution environment (TEE) of the computing device having an authenticated watchdog timer (AWDT)

FIG. 10 shows an illustrative layered architecture of a trusted execution environment (TEE) 1005 associated with the computing device 105. In simplified form, the TEE includes application, operating system, and hardware layers. The TEE is isolated and the hardware and software therein are considered trusted relative to a rich execution environment (REE) (not shown). The TEE and REE can be configured according to specifications promulgated by the GlobalPlatform® standard, although other methodologies and/or standards may also be utilized. The TEE may at least satisfy minimum requirements in which the computing device has a unique security identity, any code inside the TEE is operator-authorized (e.g., such that the TEE can be enforced using hardware so that malware that is attempted to be injected into the TEE via a buffer overrun cannot be executed by the secure processor), and any data inside the TEE cannot be read by code outside the TEE.

The trusted application layer supports one or more applications 1010 that are executable by the operating system. While the application layer of the REE can support applications such as a browser, messaging applications, and the like, applications in the TEE can support trusted operations, such as financial transactions, access to confidential or private data, and the like. An authenticated watchdog timer (AWDT) 1015 is also instantiated within the application layer of the TEE and is configured to reset the device if the AWDT does not receive a health ticket from a remote service by the expiration of a timer. Although the AWDT is shown at the application layer, it may alternatively be configured at the OS layer (e.g., in firmware), hardware layer, or a combination thereof. The AWDT is discussed in greater detail below.

The trusted operating system layer can manage system operations in which the hardware and application layers operate. In the REE, the operating system (OS) can include Windows®, whereas the TEE can run a secure OS which runs parallel to the public OS. A TEE application programming interface (API) can provide the interoperability between the REE and TEE. That is, a client TEE API in the REE can be used to commence a session with the TEE and thereby allow a trusted application inside the TEE to execute an operation.

The hardware layer supports at least processors and memory. Although the REE and TEE may operate distinctly from each other, the various hardware components can be partitioned such that portions of the hardware are dedicated for only REE operations and other portions of the hardware are dedicated for only TEE operations. This partitioning of the components and system provide the secure isolation offered by the TEE.

Figure 11:
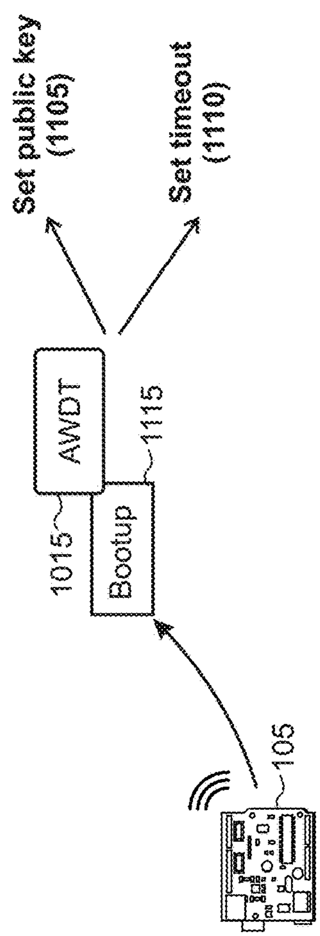
FIG. 11 shows the AWDT setting a public key and timeout at bootup.

FIG. 11 shows an illustrative environment in which the computing device 105 sets a public key 1105 and timeout 1110 for the AWDT 1015 at bootup 1115. The public key is used to verify the cryptographic signature associated with a health ticket that the computing device receives from the remote service. The AWDT uses the health ticket to reset the timer associated with the AWDT and thereby prevent a device reset/reboot. The timeout may be the time period over which the AWDT counts down before rebooting the computing device. In other embodiments, the timeout may be based on a number of boot cycles that avoid, for example, loading a network stack.

Figure 12:
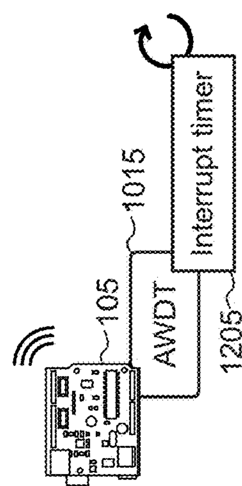
FIG. 12 shows the AWDT utilizing an interrupt timer.

FIG. 12 shows an illustrative diagram in which the computing device 105 utilizes an interrupt timer 1205. The AWDT 1015 measures elapsed time through counting interrupts and resets the computing device if the counter is not deferred. The interrupt timer resets its clock upon the AWDT receiving a valid health ticket, otherwise the AWDT reboots the computing device from, for example, ROM.

FIG. 13 shows an illustrative environment in which the remote service 110 requests a nonce (as illustratively shown by numeral 1305) from the AWDT 1015. The AWDT transmits the current nonce 1310 to the remote service responsive to the request. Once the remote service possesses the currently pending or recently created nonce, the remote service can generate a health ticket using the nonce and transmit the health ticket to the computing device, as illustratively shown by numeral 1315.

The nonce may prevent ticket-reuse and ensure freshness. The nonce may be some random number (e.g., a pseudo-random number generated from a deterministic algorithm in software or a random number generated by some other method) that the computing device previously created, stored, and provided to the remote service. The nonce allows the computing device to distinguish the most recent health ticket from earlier health tickets issued by the legitimate source (e.g., the remote service). If a nonce within a health ticket is not the same as provided by or currently pending at the computing device, then the computing device disregards that health ticket as being illegitimate and inauthentic. Failure to receive a health ticket with a correct nonce will therefore result in reboot of the computing device upon expiration of the timer associated with the AWDT. Thus, bad actors cannot interfere with the process unless they know and can change the pending nonce generated and/or stored by the computing device. The nonce may change for each reset of the timer or reboot of the computing device.

In some embodiments, other methods to secure the health ticket may be utilized, such as a list of secrets. In these examples, validating the health ticket may include comparing the secret in the health ticket to the next secret in the list. If the secret in the health ticket matches the next secret in the list, the ticket is validated. In these examples, the computing device does not generate a nonce, but rather stores the list of secrets.

In some embodiments, the health ticket may cause the computing device to reboot. The health ticket may be configured to grant a single reboot to the computing device instead of resetting the timer associated with the AWDT. Thus, issuance of the health ticket enables on-command control for the remote service to reboot the computing device, instead of having to wait for the timer to expire.

FIG. 14 shows an illustrative and non-exhaustive taxonomy of reasons for the remote service 110 to refuse to grant new health tickets to the computing device 105, as illustratively shown by numeral 1405. The taxonomy of reasons includes identifying aberrant behavior for the computing device 1410, the computing device is not up to date 1415, the remote service receives information (e.g., from a third party device) that the computing device is misbehaving 1420, or other reasons 1425.

Figure 15:
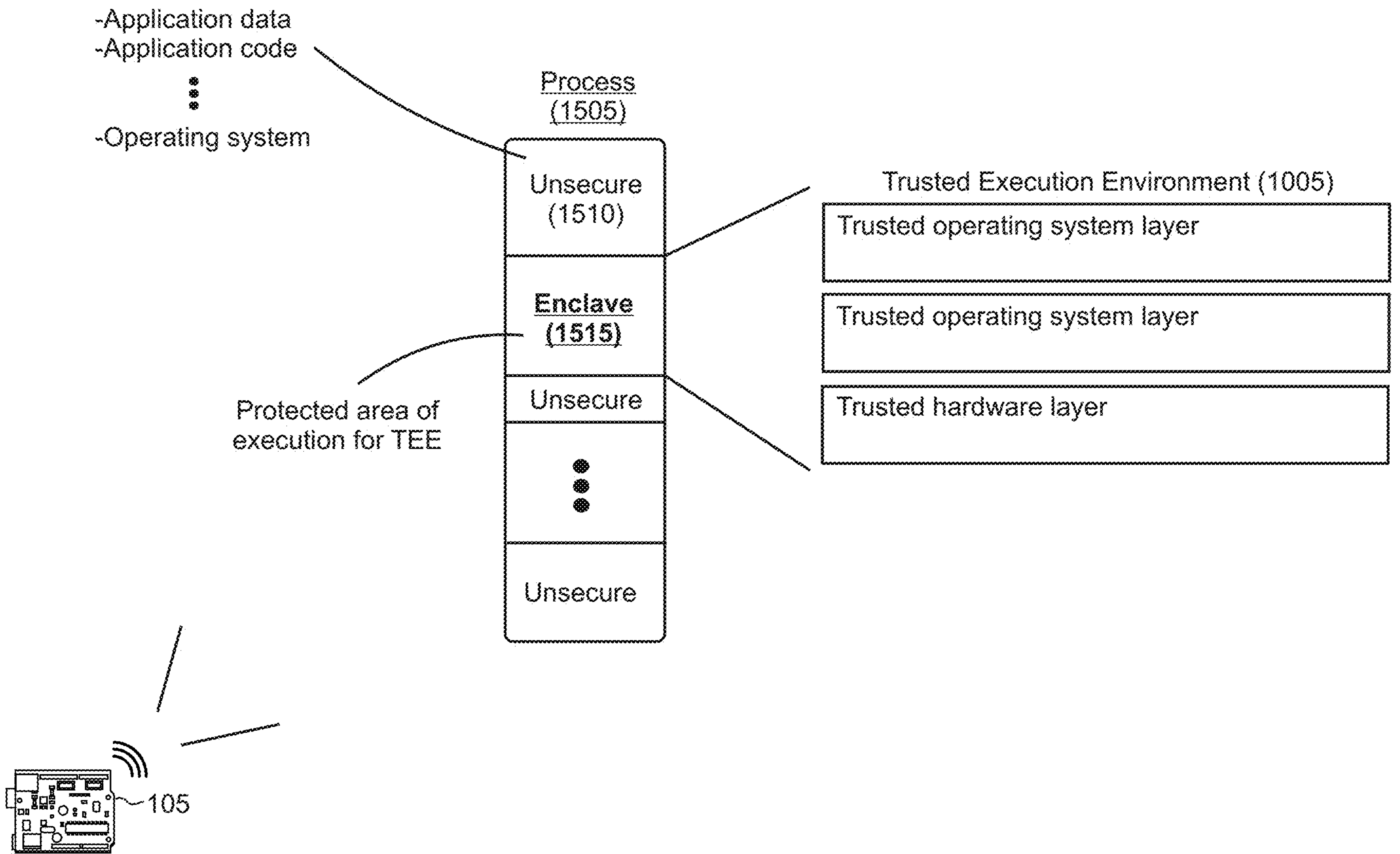
FIG. 15 shows an enclave in a process being executed within the TEE.

FIG. 15 shows an illustrative environment in which the computing device 105 is configured to perform a process 1505 which includes unsecure portions 1510 and an enclave 1515. The unsecure portions of the process may be executed within the REE and can include the processing of, for example, application data and application code and tasks performed by the operating system, among other processes. The enclave 1515 is a protected area of execution relative to unsecure portions of the process. The enclave is the trusted execution environment embedded in a respective process (e.g., process 1505), in which the TEE 1005 is utilized to perform tasks or process data within the enclave. The enclave contains and protects code and data from disclosure or modification and is only accessible and executable within the TEE.

Figures 16, 17:
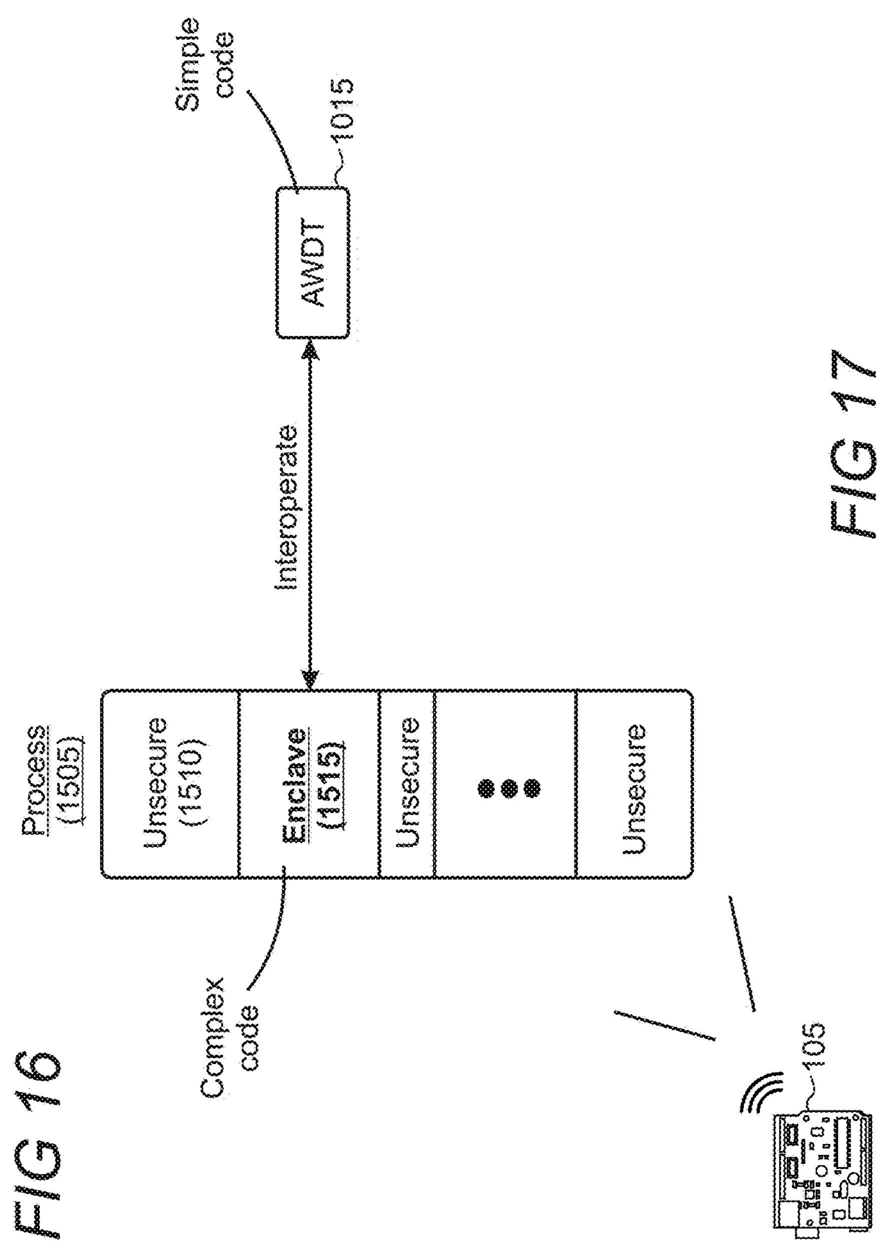
FIG. 16 shows the enclave interoperating with the AWDT.
FIG. 17 shows exemplary enclaves determining whether to continue operations or reset the computing device using the AWDT.

FIG. 16 shows an illustrative environment in which the enclave 1515 interoperates with the AWDT 1015. Interoperation between the enclave and AWDT allows for complex code embedded within an enclave to be utilized with the relatively simple code that facilitates AWDT operation. Code in an enclave can be relatively more complex than the AWDT, thereby enabling the enclave to make more sophisticated assessments of health, such as communicating with multiple servers, demanding evidence from local software that the platform is sound, etc. The complex code contained within the enclave enables analysis of the health of the computing device that is more desirable to do in, for example, firmware operations. Thus, while the AWDT can control reset of the timer and reboot of the computing device, the enclave can include a series of complex instructions to determine the health of the computing device and thereby provide greater security and protection.

The enclave can store an authorization key which is provided to the AWDT upon satisfaction of the enclave's criteria. In scenarios in which malicious actors prevent the enclave from operating within the TEE, the enclave can force a reset of the computing device by electing not to provide the key to the AWDT. Utilization of the authorization key by enclaves enables the enclave to assess the health of the computing device or to otherwise force a reset of the computing device. In either scenario, the health and security of the computing device is maintained.

FIG. 17 shows an illustrative diagram in which enclaves 1515 within their respective processes are configured to assess whether to continue operations or reset the computing device 105. Responsive to this determination, the enclave communicates with the AWDT 1015 and effectively informs the AWDT to either continue operations or reboot the computing device from, for example, ROM. The enclave may do this by, for example, electing to provide the authorization key to or withhold the authorization key from the AWDT.

Figure 18:
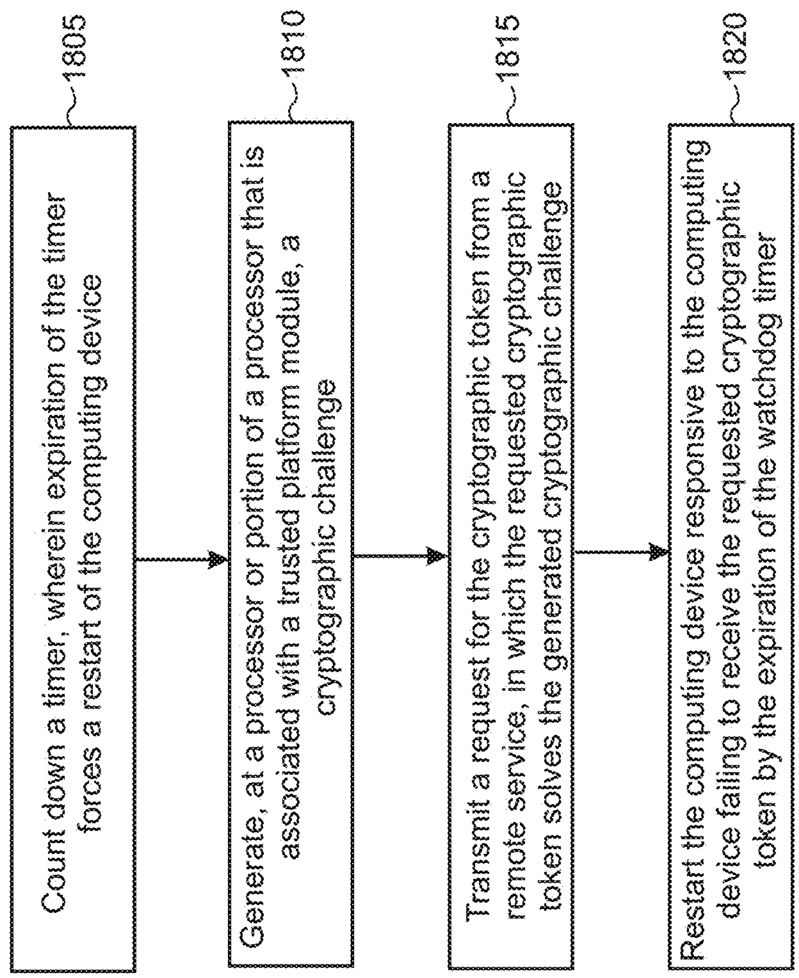
FIGS. 18-22 show flowcharts of illustrative methods performed by one or both of the computing device or the remote service.

FIG. 18 is a flowchart of an illustrative method 1800 performed by the computing device. In step 1805, a watchdog timer within the computing device's TPM counts down, wherein expiration of the watchdog timer forces a restart of the computing device. In step 1810, the computing device generates the cryptographic challenge at a processor or at a portion of a processor dedicated to the TPM. Resolution of the cryptographic challenge triggers a reset of the watchdog timer. In step 1815, the computing device transmits a request to a remote service for a cryptographic token, in which the requested cryptographic token solves the cryptographic challenge. In step 1820, the computing device restarts responsive to the computing device failing to receive the requested cryptographic token by the expiration of the watchdog timer.

Figure 19:
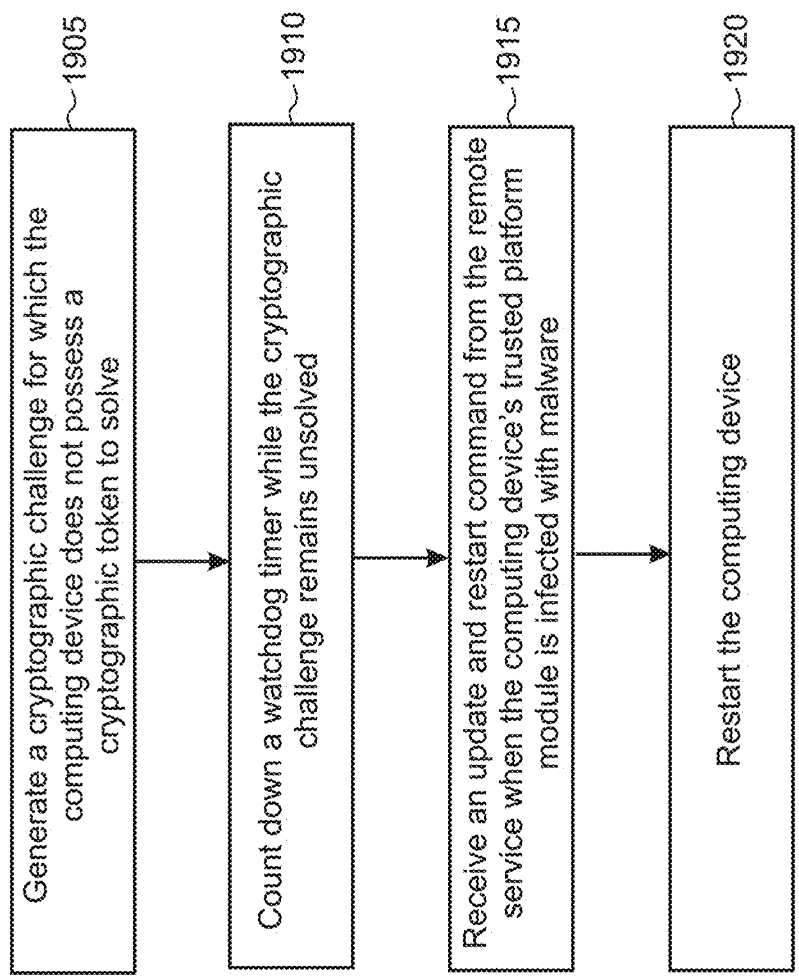

FIG. 19 is a flowchart of an illustrative method 1900 performed by the computing device. In step 1905, the computing device generates a cryptographic challenge for which the computing device does not possess a cryptographic token to solve. In step 1910, a timer counts down while the cryptographic challenge remains unsolved. In step 1915, The computing device receives an update and restart command from a remote service when the computing device's TPM is infected with malware. In step 1920, the computing device is restart.

Figure 20:
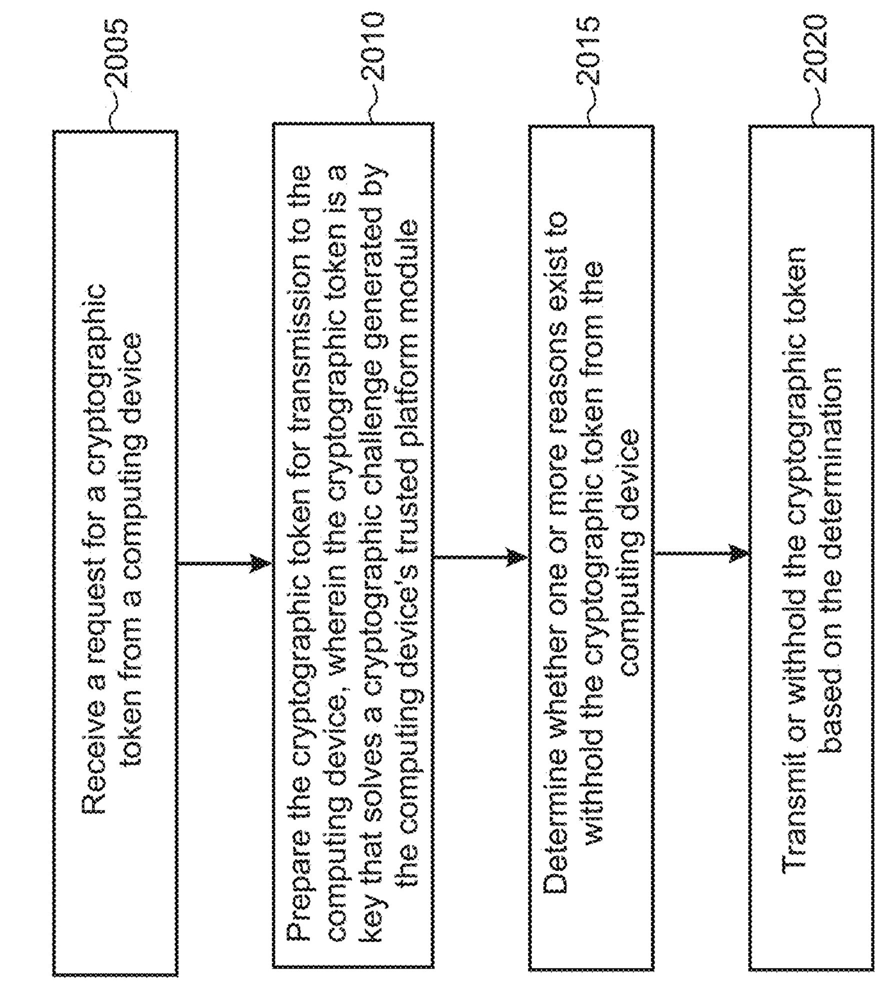

FIG. 20 is a flowchart of an illustrative method 2000 performed by a remote service. In step 2005, the remote service receives a request for a cryptographic token from a computing device. In step 2010, the remote service prepares the cryptographic token for transmission to the computing device, wherein the cryptographic token is a key that solves a cryptographic challenge generated by the computing device's TPM. In step 2015, the remote service determines whether one or more reasons exist to withhold the cryptographic token from the computing device. In step 2020, the remote service transmits or withholds the cryptographic token based on the determination.

Figure 21:
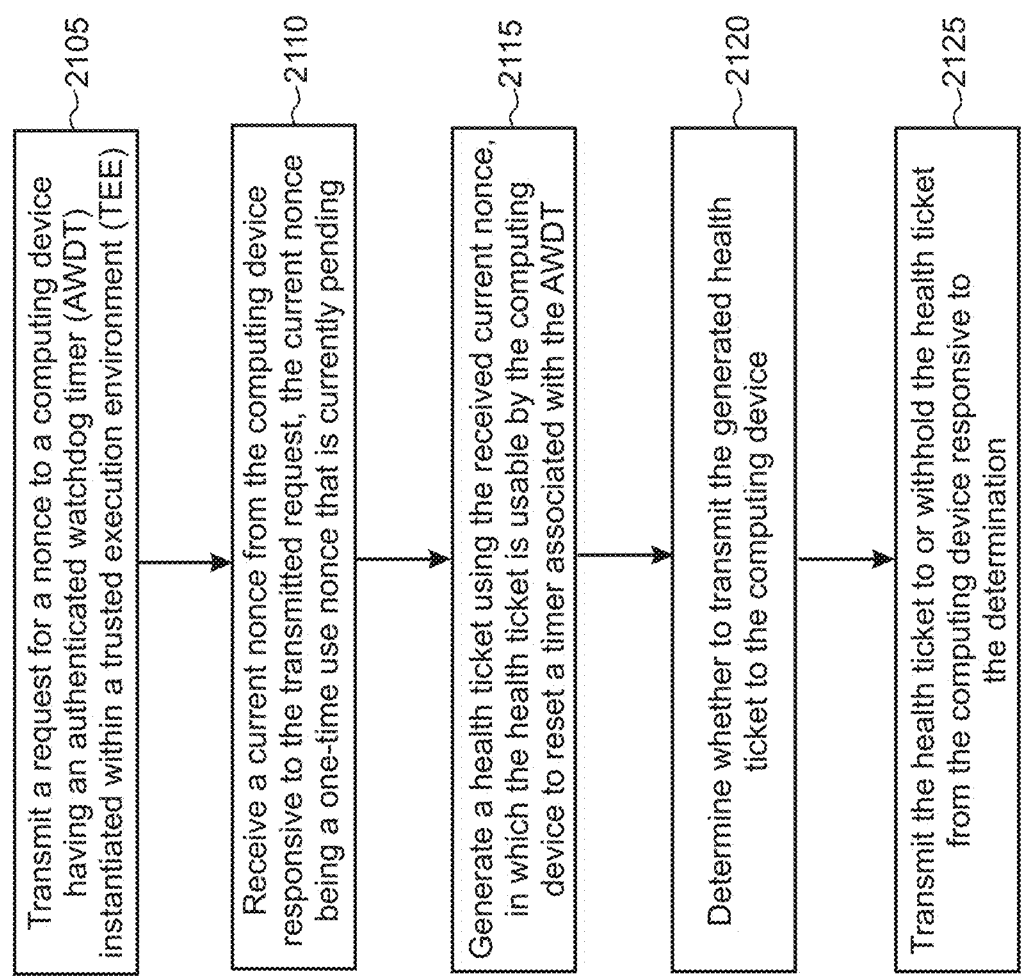

FIG. 21 is a flowchart of an illustrative method 2100 performed by the remote service. In step 2105, the remote service transmits a request for a nonce to a computing device having an authenticated watchdog timer (AWDT) instantiated within a trusted execution environment (TEE). In step 2110, the remote service receives a current nonce from the computing device responsive to the transmitted request, the current nonce being a one-time nonce that is currently pending. In step 2115, the remote service generates a health ticket using the received current nonce, in which the health ticket is usable by the computing device to reset a timer associated with the AWDT. In step 2120, the remote service determines whether to transmit the generated health ticket to the computing device. In step 2125, the remote service transmits or withholds the health ticket responsive to the determination.

Figure 22:
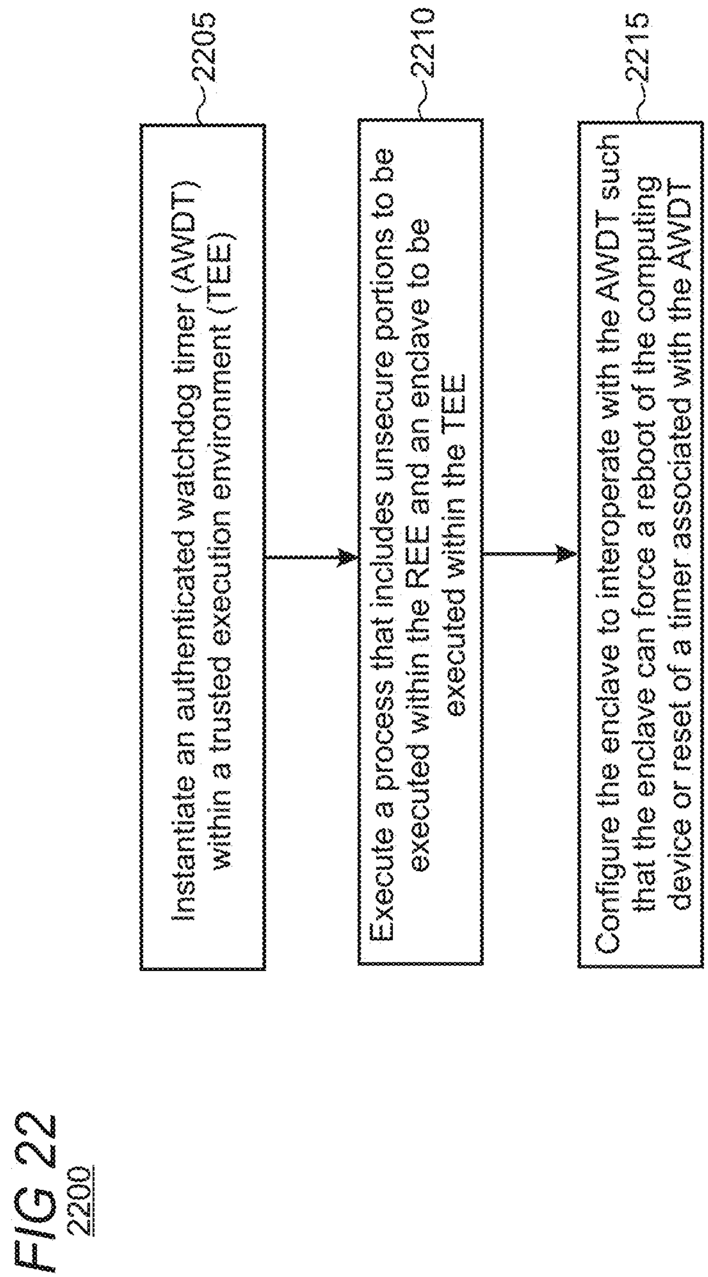

FIG. 22 is a flowchart of an illustrative method 2200 performed by a computing device. In step 2205, the computing device instantiates an AWDT within a TEE. In step 2210, the computing device executes a process that includes unsecure portions to be executed within the REE and an enclave to be executed within the TEE. In step 2215, the computing device configures the enclave to interoperate with the AWDT such that the enclave can force a reboot of the computing device or reset of a timer associated with the AWDT.

Figure 23:
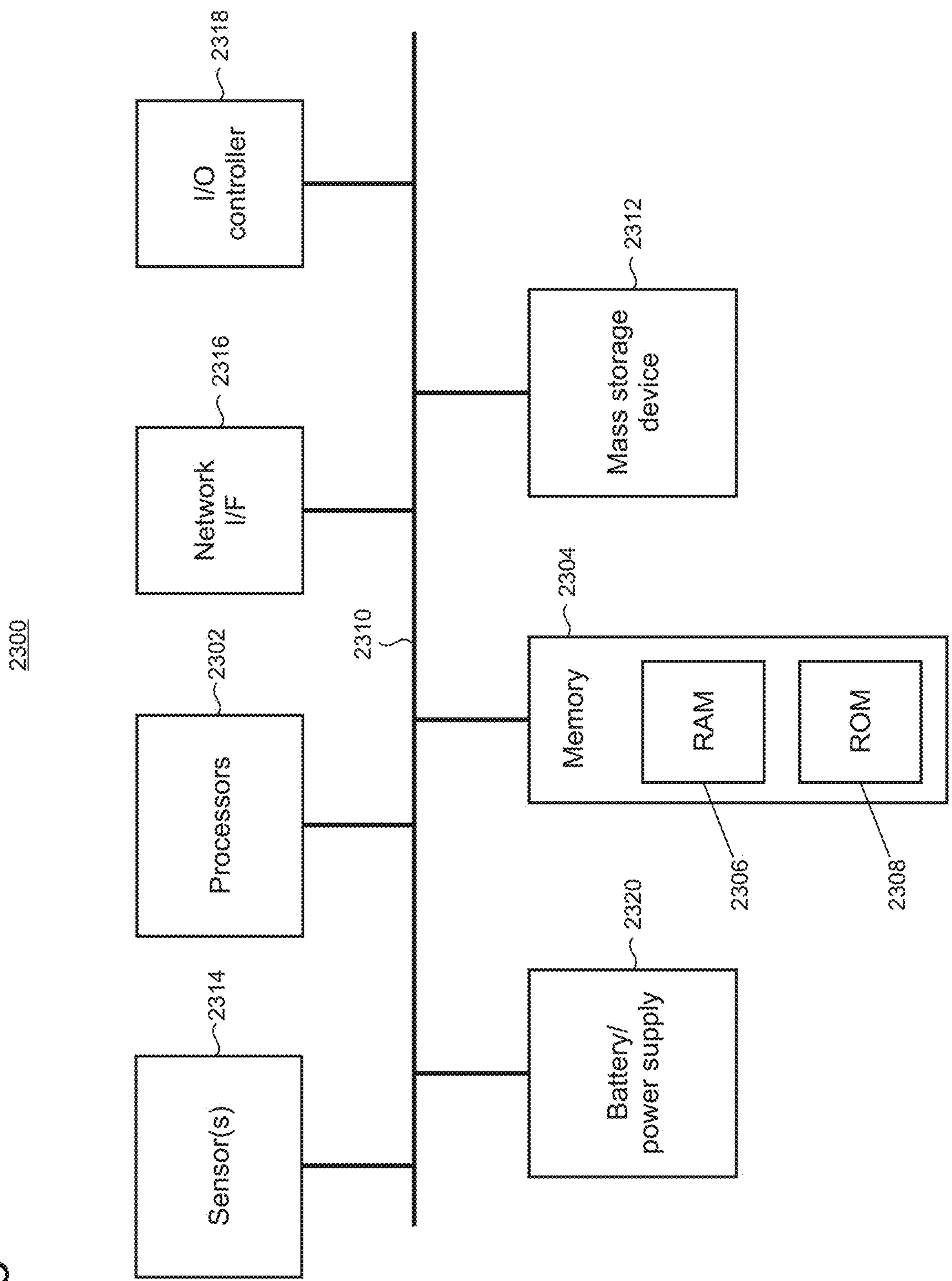
FIG. 23 is a simplified block diagram of an illustrative computing device that may be used at least in part to implement the present cryptographic hardware watchdog.

FIG. 23 shows an illustrative architecture 2300 for a computing device such as an IoT device, laptop computer, or personal computer for the present cryptographic hardware watchdog. The architecture 2300 illustrated in FIG. 23 includes one or more processors 2302 (e.g., central processing unit, dedicated Artificial Intelligence chip, graphics processing unit, etc.), a system memory 2304, including RAM (random access memory) 2306 and ROM (read only memory) 2308, and a system bus 2310 that operatively and functionally couples the components in the architecture 2300. A basic input/output system containing the basic routines that help to transfer information between elements within the architecture 2300, such as during startup, is typically stored in the ROM 2308. The architecture 2300 further includes a mass storage device 2312 for storing software code or other computer-executed code that is utilized to implement applications, the file system, and the operating system. The mass storage device 2312 is connected to the processor 2302 through a mass storage controller (not shown) connected to the bus 2310. The mass storage device 2312 and its associated computer-readable storage media provide non-volatile storage for the architecture 2300. Although the description of computer-readable storage media contained herein refers to a mass storage device, such as a hard disk or CD-ROM drive, it may be appreciated by those skilled in the art that computer-readable storage media can be any available storage media that can be accessed by the architecture 2300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 may operate in a networked environment using logical connections to remote computers through a network. The architecture 2300 may connect to the network through a network interface unit 2316 connected to the bus 2310. It may be appreciated that the network interface unit 2316 also may be utilized to connect to other types of networks and remote computer systems. The architecture 2300 also may include an input/output controller 2318 for receiving and processing input from a number of other devices, including a keyboard, mouse, touchpad, touchscreen, control devices such as buttons and switches or electronic stylus (not shown in FIG. 23). Similarly, the input/output controller 2318 may provide output to a display screen, user interface, a printer, or other type of output device (also not shown in FIG. 23).

It may be appreciated that the software components described herein may, when loaded into the processor 2302 and executed, transform the processor 2302 and the overall architecture 2300 from a general-purpose computing system into a special-purpose computing system customized to facilitate the functionality presented herein. The processor 2302 may be constructed from any number of transistors or other discrete circuit elements, which may individually or collectively assume any number of states. More specifically, the processor 2302 may operate as a finite-state machine, in response to executable instructions contained within the software modules disclosed herein. These computer-executable instructions may transform the processor 2302 by specifying how the processor 2302 transitions between states, thereby transforming the transistors or other discrete hardware elements constituting the processor 2302.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 2300 may further include one or more sensors 2314 or a battery or power supply 2320. The sensors may be coupled to the architecture to pick up data about an environment or a component, including temperature, pressure, etc. Exemplary sensors can include thermometers, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 2300 in order to store and execute the software components presented herein. It also may be appreciated that the architecture 2300 may include other types of computing devices, including wearable devices, handheld computers, embedded computer systems, smartphones, PDAs, and other types of computing devices known to those skilled in the art. It is also contemplated that the architecture 2300 may not include all of the components shown in FIG. 23, may include other components that are not explicitly shown in FIG. 23, or may utilize an architecture completely different from that shown in FIG. 23.

FIG. 24 is a simplified block diagram of an illustrative computer system 2400 such as a PC or server with which the present cryptographic hardware watchdog may be implemented. Computer system 2400 includes a processor 2405, a system memory 2411, and a system bus 2414 that couples various system components including the system memory 2411 to the processor 2405. The system bus 2414 may be any of several types of bus structures including a memory bus or memory controller, a peripheral bus, or a local bus using any of a variety of bus architectures. The system memory 2411 includes read only memory (ROM) 2417 and random access memory (RAM) 2421. A basic input/output system (BIOS) 2425, containing the basic routines that help to transfer information between elements within the computer system 2400, such as during startup, is stored in ROM 2417. The computer system 2400 may further include a hard disk drive 2428 for reading from and writing to an internally disposed hard disk (not shown), a magnetic disk drive 2430 for reading from or writing to a removable magnetic disk 2433 (e.g., a floppy disk), and an optical disk drive 2438 for reading from or writing to a removable optical disk 2443 such as a CD (compact disc), DVD (digital versatile disc), or other optical media. The hard disk drive 2428, magnetic disk drive 2430, and optical disk drive 2438 are connected to the system bus 2414 by a hard disk drive interface 2446, a magnetic disk drive interface 2449, and an optical drive interface 2452, respectively. The drives and their associated computer-readable storage media provide non-volatile storage of computer-readable instructions, data structures, program modules, and other data for the computer system 2400. Although this illustrative example includes a hard disk, a removable magnetic disk 2433, and a removable optical disk 2443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present cryptographic hardware watchdog. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 2433, optical disk 2443, ROM 2417, or RAM 2421, including an operating system 2455, one or more application programs 2457, other program modules 2460, and program data 2463. A user may enter commands and information into the computer system 2400 through input devices such as a keyboard 2466 and pointing device 2468 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2405 through a serial port interface 2471 that is coupled to the system bus 2414, but may be connected by other interfaces, such as a parallel port, game port, or universal serial bus (USB). A monitor 2473 or other type of display device is also connected to the system bus 2414 via an interface, such as a video adapter 2475. In addition to the monitor 2473, personal computers typically include other peripheral output devices (not shown), such as speakers and printers. The illustrative example shown in FIG. 24 also includes a host adapter 2478, a Small Computer System Interface (SCSI) bus 2483, and an external storage device 2476 connected to the SCSI bus 2483.

The computer system 2400 is operable in a networked environment using logical connections to one or more remote computers, such as a remote computer 2488. The remote computer 2488 may be selected as another personal computer, a server, a router, a network PC, a peer device, or other common network node, and typically includes many or all of the elements described above relative to the computer system 2400, although only a single representative remote memory/storage device 2490 is shown in FIG. 24. The logical connections depicted in FIG. 24 include a local area network (LAN) 2493 and a wide area network (WAN) 2495. Such networking environments are often deployed, for example, in offices, enterprise-wide computer networks, intranets, and the Internet.

When used in a LAN networking environment, the computer system 2400 is connected to the local area network 2493 through a network interface or adapter 2496. When used in a WAN networking environment, the computer system 2400 typically includes a broadband modem 2498, network gateway, or other means for establishing communications over the wide area network 2495, such as the Internet. The broadband modem 2498, which may be internal or external, is connected to the system bus 2414 via a serial port interface 2471. In a networked environment, program modules related to the computer system 2400, or portions thereof, may be stored in the remote memory storage device 2490. It is noted that the network connections shown in FIG. 24 are illustrative and other means of establishing a communications link between the computers may be used depending on the specific requirements of an application of the present cryptographic hardware watchdog.

Various exemplary embodiments of the present cryptographic hardware watchdog are now presented by way of illustration and not as an exhaustive list of all embodiments.

An example includes a method performed by a trusted platform module (TPM) associated with a computing device, comprising: counting down of a watchdog timer, wherein expiration of the watchdog timer forces a restart of the computing device; generating, at a processor or portion of the processor that is associated with the TPM, a cryptographic challenge, in which resolution of the cryptographic challenge triggers a reset of the watchdog timer; transmitting a request for a cryptographic token from a remote service, in which the requested cryptographic token solves the generated cryptographic challenge; and restarting the computing device responsive to the computing device failing to receive the requested cryptographic token by the expiration of the watchdog timer.

In another example, the malware is exposed to the computing device is obviated responsive to the computing device restarting. In another example, expiration of the watchdog timer causes the computing device to restart from read only memory. In another example, the remote service determines to withhold the requested cryptographic token from transmission to the computing device. As another example, the silicon associated with the computing device's processor or portion of the processor that is dedicated to the TPM is configured to solve the cryptographic challenge with the requested cryptographic token. As another example, circuitry and gates within the silicon are configured to enable the processor to solve cryptographic challenges. In another example, the watchdog timer is configured into silicon associated with the computing device's processor or portion of the processor that is dedicated to the TPM, and wherein firmware associated with the TPM is configured to solve the cryptographic challenge. In another example, the TPM is a discrete TPM or integrated TPM. As another example, the computing device does not possess the requested cryptographic token.

A further example includes a computing device configured with a trusted platform module (TPM), which is configured to receive updates to its system and restart commands from a remote service, comprising: one or more processors operating in the TPM, wherein a portion of the one or more processors' silicon is configured with a watchdog timer; a network interface in communication with the one or more processors; and one or more hardware-based memory devices comprising instructions which, when executed by the one or more processors cause the computing device to: generate a cryptographic challenge for which the computing device does not possess a cryptographic token to solve; count down the watchdog timer while the cryptographic challenge remains unsolved; receive an update and restart command from a remote service responsive to the computing device's TPM being infected with malware or is unresponsive to the remote service; and restart the computing device.

In another example, the computing device restarts responsive to installing the update and following the command being received from the remote service. In another example, the computing device restarts for failure to solve the cryptographic challenge before expiration of the watchdog timer, such that the watchdog timer triggers an interrupt to restart the computing device. In another example, the watchdog timer is adapted into the silicon of the one or more processors, wherein gates within the silicon are configured to solve cryptographic challenges upon receiving cryptographic tokens that correspondingly solve a respective cryptographic challenge. In another example, the cryptographic challenge is instantiated in the TPM's firmware. In another example, the one or more processors are configured as a discrete TPM or an integrated TPM. In another example, the computing device is an Internet of Things (IoT) device having one or more sensors for collecting data to report to the remote service.

A further example includes one or more hardware-based non-transitory computer-readable memory devices storing instructions which, when executed by one or more processors disposed in a remote service, cause the remote service to: receive a request for a cryptographic token from a computing device; prepare the cryptographic token for transmission to the computing device, wherein the cryptographic token is a key that solves a cryptographic challenge generated by the computing device's trusted platform module (TPM); and determine whether one or more reasons exist to withhold the cryptographic token from the computing device, wherein the remote service: transmits the cryptographic token to the computing device responsive to the remote service determining that no reason exists to withhold the cryptographic token; and withholds the cryptographic token responsive to one or more reasons existing.

In another example, the one or more reasons include the computing device being suspected of being exposed to malware. In another example, the one or more reasons include the computing device failing to install software or being unresponsive to commands or requests. In another example, the one or more reasons include the computing device failing to restart.

A further example includes a remote service, comprising: one or more processors; and one or more hardware-based memory devices storing computer-readable instructions which, when executed by the one or more processors, cause the remote service to: transmit a request for a nonce to a computing device having an authenticated watchdog timer (AWDT) instantiated within a trusted execution environment (TEE); receive a current nonce from the computing device responsive to the transmitted request, the current nonce being a one-time use nonce that is currently pending at the AWDT; generate a health ticket using the received current nonce, in which the health ticket is usable by the computing device to reset a timer associated with the AWDT; determine whether to transmit the generated health ticket to the computing device; and transmit or withhold the health ticket to the computing device responsive to the determination.

In another example, the remote service determines to withhold the health ticket upon identifying aberrant behavior at the computing device. In another example, the remote service determines to withhold the health ticket because the computing device is not up to date. In another example, the remote service determines to withhold the health ticket upon receiving information from a third-party device that the computing device is misbehaving. In another example, failure to transmit the health ticket forces a reset of the computing device upon expiration of a timer associated with the AWDT. In another example, the health ticket grants a single reboot of the computing device, such that receipt of the health ticket at the computing device forces a reboot. In another example, the health ticket is signed with a private key for the computing device to verify using a corresponding public key.

A further example includes a method performed by a computing device configured with a trusted execution environment (TEE) and a rich execution environment (REE), comprising: instantiating an authenticated watchdog timer (AWDT) within the TEE; executing a process that includes unsecure portions to be executed within the REE and an enclave to be executed within the TEE; and configuring the enclave to interoperate with the AWDT such that the enclave can force a reboot of the computing device or a reset of a timer associated with the AWDT.

In another example, the AWDT sets a public key upon bootup of the computing device. In another example, the AWDT sets a timeout upon bootup of the computing device. In another example, the enclave is configured to at least determine whether to continue operations or reboot the computing device. In another example, the enclave is configured with an authorization key that the enclave elects to provide to the AWDT to reset the timer and continue operations or withhold from the AWDT to force the reboot of the computing device. In another example, the enclave elects to withhold the authorization key from the AWDT responsive to the computing device preventing the processing of the enclave within the TEE. In another example, the enclave is configured to communicate with one or more remote services to determine whether to facilitate the reboot of the computing device using the AWDT. In another example, the enclave is configured to analyze software local to the computing device to determine whether the computing device is compromised, and accordingly to determine whether to facilitate the reboot of the computing device using the AWDT.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a trusted platform module (TPM) associated with a computing device, comprising:

counting down of a watchdog timer, wherein expiration of the watchdog timer forces a restart of the computing device;

generating, at a processor or portion of the processor disposed in the computing device that is associated with the TPM, a cryptographic challenge, in which solving the cryptographic challenge by the TPM triggers a reset of the watchdog timer, wherein the generated cryptographic challenge can only be solved with a cryptographic token that is not possessed by the computing device;

transmitting a request for the cryptographic token from a remote service, in which the requested cryptographic token, subsequent to receipt by the computing device from the remote service, enables the generated cryptographic challenge to be solved by the TPM; and restarting the computing device responsive to the computing device failing to receive the requested cryptographic token required for the TPM to solve the cryptographic challenge by the expiration of the watchdog timer.

2. The method of claim 1, in which malware exposed to the computing device is obviated responsive to the computing device restarting.

3. The method of claim 1, in which expiration of the watchdog timer causes the computing device to restart from read only memory.

4. The method of claim 1, in which the remote service determines to withhold the requested cryptographic token from transmission to the computing device.

5. The method of claim 1, in which silicon associated with the computing device's processor or portion of the processor that is dedicated to the TPM is configured to solve the cryptographic challenge with the requested cryptographic token.

6. The method of claim 5, in which circuitry and gates within the silicon are configured to enable the processor to solve cryptographic challenges.

7. The method of claim 1, in which the watchdog timer is configured into silicon associated with the computing device's processor or portion of the processor that is dedicated to the TPM, and wherein firmware associated with the TPM is configured to solve the cryptographic challenge.

8. The method of claim 1, in which the TPM is a discrete TPM or integrated TPM.

9. The method of claim 1, in which the computing device does not possess the requested cryptographic token.

10. A computing device configured with a trusted platform module (TPM) which is configured to receive updates to its system and restart commands from a remote service, comprising:

one or more processors operating in the TPM, wherein a portion of the one or more processors' silicon is configured with a watchdog timer;

a network interface in communication with the one or more processors; and one or more hardware-based memory devices comprising instructions which, when executed by the one or more processors cause the computing device to:

generate a cryptographic challenge that can only be solved by the TPM using a cryptographic token which the computing device does not possess;

count down the watchdog timer while the cryptographic challenge remains unsolved by the TPM;

receive an update and restart command from a remote service responsive to the computing device's TPM being unable to solve the cryptographic challenge; and restart the computing device.

11. The computing device of claim 10, in which the computing device restarts responsive to installing the update and following the restart command being received from the remote service.

12. The computing device of claim 10, in which the computing device restarts for failure to solve the cryptographic challenge before expiration of the watchdog timer, such that the watchdog timer triggers an interrupt to restart the computing device.

13. The computing device of claim 10, in which the watchdog timer is adapted into the silicon of the one or more processors, wherein gates within the silicon are configured to solve cryptographic challenges upon receiving cryptographic tokens that correspondingly solve a respective cryptographic challenge.

14. The computing device of claim 10, in which the cryptographic challenge is instantiated in the TPM's firmware.

15. The computing device of claim 14, in which the one or more processors are configured as a discrete TPM or an integrated TPM.

16. The computing device of claim 10, in which the computing device is an Internet of Things (IoT) device having one or more sensors for collecting data to report to the remote service.

17. One or more hardware-based non-transitory computer-readable memory devices storing instructions which, when executed by one or more processors disposed in a remote service, cause the remote service to:

receive a request for a cryptographic token from a computing device;

prepare the cryptographic token for transmission to the computing device, wherein the cryptographic token is a key that solves a cryptographic challenge generated by the computing device's trusted platform module (TPM), and wherein the generated cryptographic challenge can only be solved with the cryptographic token that is not possessed by the computing device; and determine whether one or more reasons exist to withhold the cryptographic token from the computing device, wherein the remote service:

transmits the cryptographic token to the computing device responsive to the remote service determining that no reason exists to withhold the cryptographic token; and withholds the cryptographic token responsive to one or more reasons existing.

18. The one or more hardware-based non-transitory computer-readable memory devices of claim 17, in which the one or more reasons include the computing device being suspected of being exposed to malware.

19. The one or more hardware-based non-transitory computer-readable memory devices of claim 17, in which the one or more reasons include the computing device failing to install software or being unresponsive to commands or requests.

20. The one or more hardware-based non-transitory computer-readable memory devices of claim 17, in which the one or more reasons include the computing device failing to restart.

* * * * *